(12) United States Patent
Ericksen et al.

(10) Patent No.: US 12,371,122 B2
(45) Date of Patent: Jul. 29, 2025

(54) METHOD AND APPARATUS FOR AN ADJUSTABLE DAMPER

(71) Applicant: Fox Factory, Inc., Duluth, GA (US)

(72) Inventors: Everet Ericksen, Woodland, CA (US);
Robert C. Fox, Scotts Valley, CA (US);
David Batterbee, Buckingham (GB);
John Marking, El Cajon, CA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

(21) Appl. No.: 18/407,270

(22) Filed: Jan. 8, 2024

(65) Prior Publication Data

US 2024/0308618 A1    Sep. 19, 2024

Related U.S. Application Data

(60) Continuation of application No. 17/716,919, filed on Apr. 8, 2022, now Pat. No. 11,866,120, which is a continuation of application No. 16/838,484, filed on Apr. 2, 2020, now Pat. No. 11,681,652, which is a continuation of application No. 16/224,516, filed on Dec. 18, 2018, now Pat. No. 10,723,409, which is a continuation of application No. 15/599,469, filed on May 19, 2017, now Pat. No. 10,160,511, which is a continuation of application No. 14/690,267, filed on Apr. 17, 2015, now Pat. No. 9,663,181, which is a
(Continued)

(51) Int. Cl.
*F16F 9/348* (2006.01)
*B60G 17/08* (2006.01)
*B62K 25/08* (2006.01)
*F16F 9/46* (2006.01)
*F16F 9/512* (2006.01)
*B62K 25/04* (2006.01)

(52) U.S. Cl.
CPC .............. *B62K 25/08* (2013.01); *B60G 17/08* (2013.01); *F16F 9/465* (2013.01); *F16F 9/5126* (2013.01); *B62K 2025/044* (2013.01)

(58) Field of Classification Search
CPC .. B62K 25/08; B62K 2025/044; B60G 17/08; F16F 9/465; F16F 9/5126; F16F 9/3482; F16F 9/3488
See application file for complete search history.

(56) References Cited

U.S. PATENT DOCUMENTS

| | | |
|---|---|---|
| 435,995 A | 9/1890 | Dunlop |
| 1,078,060 A | 11/1913 | Newman |

(Continued)

FOREIGN PATENT DOCUMENTS

| | | |
|---|---|---|
| AU | 2006222732 A1 | 10/2006 |
| CN | 101468587 A | 7/2009 |

(Continued)

OTHER PUBLICATIONS

Electronic Translation of DE3709447A1.
(Continued)

*Primary Examiner* — Thomas W Irvin

(57) ABSTRACT

A vehicle suspension damper is described. The vehicle suspension damper includes: a pilot valve assembly; a primary valve; and an adjuster, wherein the pilot valve assembly meters fluid to the primary valve, and the adjuster moves the primary valve.

9 Claims, 8 Drawing Sheets

Related U.S. Application Data division of application No. 13/843,704, filed on Mar. 15, 2013, now Pat. No. 9,033,122, which is a continuation-in-part of application No. 13/485,401, filed on May 31, 2012, now abandoned, and a continuation-in-part of application No. 13/189,216, filed on Jul. 22, 2011, now Pat. No. 9,239,090, which is a continuation-in-part of application No. 13/175,244, filed on Jul. 1, 2011, now Pat. No. 8,627,932, and a continuation-in-part of application No. 13/010,697, filed on Jan. 20, 2011, now Pat. No. 8,857,580, said application No. 13/843,704 is a continuation-in-part of application No. 12/684,072, filed on Jan. 7, 2010, now abandoned.

(60) Provisional application No. 61/709,041, filed on Oct. 2, 2012, provisional application No. 61/667,327, filed on Jul. 2, 2012, provisional application No. 61/645,465, filed on May 10, 2012, provisional application No. 61/491,858, filed on May 31, 2011, provisional application No. 61/361,127, filed on Jul. 2, 2010, provisional application No. 61/296,826, filed on Jan. 20, 2010, provisional application No. 61/143,152, filed on Jan. 7, 2009.

(56) References Cited

U.S. PATENT DOCUMENTS

| | | |
|---|---|---|
| 1,307,502 A | 6/1919 | Martin |
| 1,313,763 A | 8/1919 | Thomas |
| 1,409,849 A | 3/1922 | Haeberlein |
| 1,468,652 A | 9/1923 | Storey et al. |
| 1,492,731 A | 5/1924 | Kerr |
| 1,560,477 A | 11/1925 | Kessler |
| 1,571,788 A | 2/1926 | Bramlette, Jr. |
| 1,575,973 A | 3/1926 | Coleman |
| 1,655,786 A | 1/1928 | Guerritore et al. |
| 1,923,011 A | 8/1933 | Moulton |
| 1,948,600 A | 2/1934 | Templeton |
| 1,970,239 A | 8/1934 | Klaas |
| 2,018,312 A | 10/1935 | Moulton |
| 2,098,119 A | 11/1937 | White |
| 2,115,072 A | 4/1938 | Hunt et al. |
| 2,122,407 A | 7/1938 | Chisholm |
| 2,186,266 A | 1/1940 | Henry |
| 2,259,437 A | 10/1941 | Dean |
| 2,354,340 A | 7/1944 | Utter |
| 2,363,867 A | 11/1944 | Isely |
| 2,379,750 A | 7/1945 | Rossman |
| 2,492,331 A | 12/1949 | Spring |
| 2,518,553 A | 8/1950 | Kieber |
| 2,540,525 A | 2/1951 | Howarth et al. |
| 2,559,633 A | 7/1951 | Maurice et al. |
| 2,588,520 A | 3/1952 | Halgren et al. |
| 2,697,600 A | 12/1954 | Gregoire |
| 2,705,119 A | 3/1955 | Ingwer |
| 2,725,076 A | 11/1955 | Hansen et al. |
| 2,729,308 A | 1/1956 | Koski et al. |
| 2,778,378 A | 1/1957 | Presnell |
| 2,784,962 A | 3/1957 | Sherburne |
| 2,809,722 A | 10/1957 | Smith |
| 2,838,140 A | 6/1958 | Rasmusson et al. |
| 2,846,028 A | 8/1958 | Gunther |
| 2,853,974 A | 9/1958 | Hewitt |
| 2,879,971 A | 3/1959 | Demay |
| 2,883,181 A | 4/1959 | Hogan et al. |
| 2,897,613 A | 8/1959 | Davidson et al. |
| 2,924,304 A | 2/1960 | Patriquin |
| 2,941,629 A | 6/1960 | Etienne et al. |
| 2,967,065 A | 1/1961 | Schwendner |
| 2,973,744 A | 3/1961 | Hennells |
| 2,991,804 A | 7/1961 | Merkle |
| 3,003,595 A | 10/1961 | Patriquin et al. |
| 3,056,598 A | 10/1962 | Sutton et al. |
| 3,071,394 A | 1/1963 | John |
| 3,073,586 A | 1/1963 | Hartel et al. |
| 3,074,709 A | 1/1963 | Ellis et al. |
| 3,085,530 A | 4/1963 | Williamson |
| 3,087,583 A | 4/1963 | Bruns |
| 3,107,753 A | 10/1963 | Georgette et al. |
| 3,127,958 A | 4/1964 | Szostak |
| 3,175,645 A | 3/1965 | Schafer et al. |
| 3,202,413 A | 8/1965 | Colmerauer |
| 3,206,153 A | 9/1965 | Burke |
| 3,207,270 A | 9/1965 | Ellis |
| 3,216,535 A | 11/1965 | Schultze |
| 3,238,850 A | 3/1966 | Desmarchelier |
| 3,284,076 A | 11/1966 | Gibson |
| 3,286,797 A | 11/1966 | Leibfritz et al. |
| 3,405,625 A | 10/1968 | Carlson et al. |
| 3,419,849 A | 12/1968 | Anderson et al. |
| 3,420,493 A | 1/1969 | Kraft et al. |
| 3,447,644 A | 6/1969 | Duckett |
| 3,494,606 A | 2/1970 | Hanchen |
| 3,528,700 A | 9/1970 | Janu et al. |
| 3,537,722 A | 11/1970 | Moulton |
| 3,556,137 A | 1/1971 | Billeter et al. |
| 3,559,027 A | 1/1971 | Arsem |
| 3,560,033 A | 2/1971 | Barkus |
| 3,575,442 A | 4/1971 | Elliott et al. |
| 3,584,331 A | 6/1971 | Richard et al. |
| 3,603,575 A | 9/1971 | Arlasky et al. |
| 3,605,960 A | 9/1971 | Singer |
| 3,618,972 A | 11/1971 | Buhl |
| 3,621,950 A | 11/1971 | Lutz |
| 3,650,033 A | 3/1972 | Behne et al. |
| 3,701,544 A | 10/1972 | Stankovich |
| 3,714,953 A | 2/1973 | Solvang |
| 3,750,856 A | 8/1973 | Kenworthy et al. |
| 3,784,228 A | 1/1974 | Hoffmann et al. |
| 3,791,408 A | 2/1974 | Saitou et al. |
| 3,792,644 A | 2/1974 | Ferguson et al. |
| 3,795,291 A | 3/1974 | Naito et al. |
| 3,830,482 A | 8/1974 | Norris |
| 3,842,753 A | 10/1974 | Ross et al. |
| 3,861,487 A | 1/1975 | Gill |
| 3,903,613 A | 9/1975 | Bisberg |
| 3,941,402 A | 3/1976 | Yankowski et al. |
| 3,974,910 A | 8/1976 | Papai |
| 3,981,204 A | 9/1976 | Starbard et al. |
| 3,981,479 A | 9/1976 | Foster et al. |
| 3,986,118 A | 10/1976 | Madigan |
| 3,995,883 A | 12/1976 | Glaze |
| 4,007,855 A | 2/1977 | Hierath et al. |
| 4,022,113 A | 5/1977 | Blatt et al. |
| 4,032,829 A | 6/1977 | Schenavar et al. |
| 4,036,335 A | 7/1977 | Thompson et al. |
| 4,045,008 A | 8/1977 | Bauer |
| 4,072,087 A | 2/1978 | Mueller et al. |
| 4,103,881 A | 8/1978 | Simich |
| 4,106,522 A | 8/1978 | Manesse |
| 4,114,735 A | 9/1978 | Kato |
| 4,121,610 A | 10/1978 | Harms et al. |
| 4,131,657 A | 12/1978 | Ball et al. |
| 4,139,186 A | 2/1979 | Postema et al. |
| 4,153,237 A | 5/1979 | Supalla |
| 4,159,106 A | 6/1979 | Nyman et al. |
| 4,166,612 A | 9/1979 | Freitag et al. |
| 4,174,098 A | 11/1979 | Baker et al. |
| 4,183,509 A | 1/1980 | Nishikawa et al. |
| 4,236,613 A | 12/1980 | Van Der Lely |
| 4,287,812 A | 9/1981 | Iizumi |
| 4,291,850 A | 9/1981 | Sharples |
| 4,305,566 A | 12/1981 | Grawunde |
| 4,311,302 A | 1/1982 | Heyer et al. |
| 4,333,668 A | 6/1982 | Hendrickson et al. |
| 4,334,711 A | 6/1982 | Mazur et al. |
| 4,337,850 A | 7/1982 | Shimokura et al. |
| 4,348,016 A | 9/1982 | Milly |
| 4,351,515 A | 9/1982 | Yoshida |
| 4,366,969 A | 1/1983 | Benya et al. |
| 4,387,781 A | 6/1983 | Ezell et al. |

(56) References Cited

U.S. PATENT DOCUMENTS

| | | |
|---|---|---|
| 4,437,548 A | 3/1984 | Ashiba et al. |
| 4,465,299 A | 8/1984 | Stone et al. |
| 4,474,363 A | 10/1984 | Numazawa et al. |
| 4,491,207 A | 1/1985 | Boonchanta et al. |
| 4,500,827 A | 2/1985 | Merritt et al. |
| 4,502,673 A | 3/1985 | Clark et al. |
| 4,529,180 A | 7/1985 | Hill |
| 4,546,959 A | 10/1985 | Tanno |
| 4,548,233 A | 10/1985 | Wolfges |
| 4,550,899 A | 11/1985 | Holley |
| 4,570,851 A | 2/1986 | Cirillo et al. |
| 4,572,317 A | 2/1986 | Isono et al. |
| 4,588,053 A | 5/1986 | Foster |
| 4,616,810 A | 10/1986 | Richardson et al. |
| 4,620,619 A | 11/1986 | Emura et al. |
| 4,624,346 A | 11/1986 | Katz et al. |
| 4,630,818 A | 12/1986 | Saarinen |
| 4,634,142 A | 1/1987 | Woods et al. |
| 4,647,068 A | 3/1987 | Asami et al. |
| 4,655,440 A | 4/1987 | Eckert |
| 4,657,280 A | 4/1987 | Ohmori et al. |
| 4,659,104 A | 4/1987 | Tanaka et al. |
| 4,660,689 A | 4/1987 | Hayashi et al. |
| 4,662,616 A | 5/1987 | Hennells |
| 4,673,194 A | 6/1987 | Sugasawa |
| 4,696,489 A | 9/1987 | Fujishiro et al. |
| 4,709,779 A | 12/1987 | Takehara |
| 4,723,753 A | 2/1988 | Torimoto et al. |
| 4,729,459 A | 3/1988 | Inagaki et al. |
| 4,732,244 A | 3/1988 | Verkuylen |
| 4,743,000 A | 5/1988 | Karnopp |
| 4,744,444 A | 5/1988 | Gillingham |
| 4,750,735 A | 6/1988 | Furgerson et al. |
| 4,765,648 A | 8/1988 | Mander et al. |
| 4,773,671 A | 9/1988 | Inagaki |
| 4,786,034 A | 11/1988 | Heess et al. |
| 4,802,561 A | 2/1989 | Knecht et al. |
| 4,806,082 A | 2/1989 | Schenk |
| 4,815,575 A | 3/1989 | Murty et al. |
| 4,821,852 A | 4/1989 | Yokoya |
| 4,826,207 A | 5/1989 | Yoshioka et al. |
| 4,830,395 A | 5/1989 | Foley |
| 4,836,578 A | 6/1989 | Soltis |
| 4,838,306 A | 6/1989 | Horn et al. |
| 4,838,394 A | 6/1989 | Lemme et al. |
| 4,838,527 A | 6/1989 | Holley |
| 4,846,317 A | 7/1989 | Hudgens |
| 4,858,733 A | 8/1989 | Noguchi et al. |
| 4,892,328 A | 1/1990 | Kurtzman et al. |
| 4,919,166 A | 4/1990 | Sims et al. |
| 4,936,423 A | 6/1990 | Karnopp |
| 4,936,424 A | 6/1990 | Costa |
| 4,938,228 A | 7/1990 | Righter |
| 4,949,262 A | 8/1990 | Buma et al. |
| 4,949,989 A | 8/1990 | Kakizaki et al. |
| 4,958,706 A | 9/1990 | Richardson et al. |
| 4,972,928 A | 11/1990 | Sirven |
| 4,975,849 A | 12/1990 | Ema et al. |
| 4,984,819 A | 1/1991 | Kakizaki et al. |
| 4,986,393 A | 1/1991 | Preukschat et al. |
| 5,027,303 A | 6/1991 | Witte |
| 5,031,455 A | 7/1991 | Cline |
| 5,036,934 A | 8/1991 | Nishina et al. |
| 5,040,381 A | 8/1991 | Hazen |
| 5,044,614 A | 9/1991 | Rau |
| 5,060,910 A | 10/1991 | Iwata et al. |
| 5,060,959 A | 10/1991 | Davis et al. |
| 5,072,812 A | 12/1991 | Imaizumi |
| 5,074,624 A | 12/1991 | Stauble et al. |
| 5,076,404 A | 12/1991 | Gustafsson |
| 5,080,392 A | 1/1992 | Bazergui |
| 5,094,325 A | 3/1992 | Smith |
| 5,105,918 A | 4/1992 | Hagiwara et al. |
| 5,113,980 A | 5/1992 | Furrer et al. |
| 5,127,634 A | 7/1992 | Le Gourvellec |
| 5,152,547 A | 10/1992 | Davis |
| 5,161,653 A | 11/1992 | Hare |
| 5,161,817 A | 11/1992 | Daum et al. |
| 5,163,742 A | 11/1992 | Topfer et al. |
| 5,178,242 A | 1/1993 | Nakamura et al. |
| 5,186,481 A | 2/1993 | Turner |
| 5,203,584 A | 4/1993 | Butsuen et al. |
| 5,207,300 A | 5/1993 | Engel et al. |
| 5,207,774 A | 5/1993 | Wolfe et al. |
| 5,230,364 A | 7/1993 | Leng et al. |
| 5,231,583 A | 7/1993 | Lizell |
| 5,236,169 A | 8/1993 | Johnsen et al. |
| 5,246,247 A | 9/1993 | Runkel |
| 5,248,014 A | 9/1993 | Ashiba |
| 5,259,487 A | 11/1993 | Petek et al. |
| 5,263,559 A | 11/1993 | Mettner |
| 5,265,902 A | 11/1993 | Lewis |
| 5,266,065 A | 11/1993 | Ancarani |
| 5,275,086 A | 1/1994 | Stallings, Jr. |
| 5,277,283 A | 1/1994 | Yamaoka et al. |
| 5,283,733 A | 2/1994 | Colley |
| 5,284,330 A | 2/1994 | Carlson et al. |
| 5,293,971 A | 3/1994 | Kanari |
| 5,295,074 A | 3/1994 | Williams |
| 5,295,563 A | 3/1994 | Bennett |
| 5,295,916 A | 3/1994 | Chattin |
| 5,297,045 A | 3/1994 | Williams et al. |
| 5,301,776 A | 4/1994 | Beck |
| 5,307,907 A | 5/1994 | Nakamura et al. |
| 5,310,203 A | 5/1994 | Chen |
| 5,311,709 A | 5/1994 | Kobori et al. |
| 5,318,066 A | 6/1994 | Burgorf et al. |
| 5,328,004 A | 7/1994 | Fannin et al. |
| 5,346,242 A | 9/1994 | Karnopp |
| 5,347,186 A | 9/1994 | Konotchick et al. |
| 5,348,112 A | 9/1994 | Vaillancourt |
| 5,372,223 A | 12/1994 | Dekock et al. |
| 5,372,224 A | 12/1994 | Samonil et al. |
| 5,381,952 A | 1/1995 | Duprez |
| 5,390,121 A | 2/1995 | Wolfe |
| 5,390,949 A | 2/1995 | Naganathan et al. |
| 5,392,885 A | 2/1995 | Patzenhauer et al. |
| 5,392,886 A | 2/1995 | Drummond |
| 5,396,973 A | 3/1995 | Schwemmer et al. |
| 5,398,787 A | 3/1995 | Woessner et al. |
| 5,413,196 A | 5/1995 | Forster |
| 5,445,366 A | 8/1995 | Shih et al. |
| 5,467,280 A | 11/1995 | Kimura |
| 5,475,593 A | 12/1995 | Townend |
| 5,480,011 A | 1/1996 | Nagai et al. |
| 5,485,417 A | 1/1996 | Wolf et al. |
| 5,487,006 A | 1/1996 | Kakizaki et al. |
| 5,503,258 A | 4/1996 | Clarke et al. |
| 5,507,371 A | 4/1996 | Takahashi |
| 5,517,898 A | 5/1996 | Kim et al. |
| 5,542,150 A | 8/1996 | Tu |
| 5,551,674 A | 9/1996 | Johnsen |
| 5,553,836 A | 9/1996 | Ericson |
| 5,558,190 A | 9/1996 | Chang |
| 5,566,794 A | 10/1996 | Wiard |
| 5,578,877 A | 11/1996 | Tiemann |
| 5,586,637 A | 12/1996 | Aidlin et al. |
| 5,588,510 A | 12/1996 | Wilke |
| 5,592,401 A | 1/1997 | Kramer |
| 5,597,180 A | 1/1997 | Ganzel et al. |
| 5,598,337 A | 1/1997 | Butsuen et al. |
| 5,599,244 A | 2/1997 | Ethington |
| 5,601,164 A | 2/1997 | Ohsaki et al. |
| 5,611,413 A | 3/1997 | Feigel |
| 5,634,563 A | 6/1997 | Peng |
| 5,651,433 A | 7/1997 | Wirth et al. |
| 5,657,840 A | 8/1997 | Lizell |
| 5,687,575 A | 11/1997 | Keville et al. |
| 5,697,477 A | 12/1997 | Hiramoto et al. |
| 5,699,885 A | 12/1997 | Forster |
| 5,722,645 A | 3/1998 | Reitter |
| 5,735,372 A | 4/1998 | Hamilton et al. |
| 5,803,443 A | 9/1998 | Chang |
| 5,806,159 A | 9/1998 | Ohnishi et al. |

(56) References Cited

U.S. PATENT DOCUMENTS

| | | |
|---|---|---|
| 5,810,128 A | 9/1998 | Eriksson et al. |
| 5,810,384 A | 9/1998 | Iwasaki et al. |
| 5,813,456 A | 9/1998 | Milner et al. |
| 5,813,731 A | 9/1998 | Newman et al. |
| 5,816,281 A | 10/1998 | Mixon |
| 5,818,132 A | 10/1998 | Konotchick et al. |
| 5,826,935 A | 10/1998 | Defreitas et al. |
| 5,828,843 A | 10/1998 | Samuel et al. |
| 5,829,733 A | 11/1998 | Becker |
| 5,833,036 A | 11/1998 | Gillespie |
| 5,850,352 A | 12/1998 | Moezzi et al. |
| 5,850,896 A | 12/1998 | Tanaka |
| 5,853,071 A | 12/1998 | Robinson |
| 5,872,418 A | 2/1999 | Wischnewskiy |
| 5,884,921 A | 3/1999 | Katsuda et al. |
| 5,937,975 A | 8/1999 | Forster |
| 5,947,238 A | 9/1999 | Jolly et al. |
| 5,952,823 A | 9/1999 | Sprecher et al. |
| 5,954,318 A | 9/1999 | Kluhsman |
| 5,956,951 A | 9/1999 | O'Callaghan |
| 5,957,252 A | 9/1999 | Berthold |
| 5,971,116 A | 10/1999 | Franklin |
| 5,987,368 A | 11/1999 | Kamimae et al. |
| 5,988,330 A | 11/1999 | Morris |
| 5,988,332 A | 11/1999 | Marzocchi et al. |
| 5,988,655 A | 11/1999 | Sakai et al. |
| 5,992,450 A | 11/1999 | Parker et al. |
| 5,996,745 A | 12/1999 | Jones et al. |
| 5,996,746 A | 12/1999 | Turner et al. |
| 5,999,868 A | 12/1999 | Beno et al. |
| 6,000,702 A | 12/1999 | Streiter |
| 6,013,007 A | 1/2000 | Root et al. |
| 6,017,047 A | 1/2000 | Hoose |
| 6,029,958 A | 2/2000 | Larsson et al. |
| 6,035,979 A | 3/2000 | Forster |
| 6,050,583 A | 4/2000 | Bohn |
| 6,058,340 A | 5/2000 | Uchiyama et al. |
| 6,067,490 A | 5/2000 | Ichimaru et al. |
| 6,073,536 A | 6/2000 | Campbell |
| 6,073,700 A | 6/2000 | Tsuji et al. |
| 6,073,708 A | 6/2000 | Brown et al. |
| 6,073,736 A | 6/2000 | Franklin |
| 6,079,526 A | 6/2000 | Nezu et al. |
| 6,092,011 A | 7/2000 | Hiramoto et al. |
| 6,092,816 A | 7/2000 | Sekine et al. |
| 6,105,988 A | 8/2000 | Turner et al. |
| 6,112,868 A | 9/2000 | Graham et al. |
| 6,120,049 A | 9/2000 | Gonzalez et al. |
| 6,131,709 A | 10/2000 | Jolly et al. |
| 6,135,434 A | 10/2000 | Marking |
| 6,141,969 A | 11/2000 | Launchbury et al. |
| 6,151,930 A | 11/2000 | Carlson |
| 6,152,856 A | 11/2000 | Studor et al. |
| 6,157,103 A | 12/2000 | Ohta et al. |
| 6,179,098 B1 | 1/2001 | Hayakawa et al. |
| 6,182,687 B1 | 2/2001 | Förster et al. |
| 6,182,805 B1 | 2/2001 | Kashiwagi et al. |
| 6,196,555 B1 | 3/2001 | Gaibler |
| 6,199,669 B1 | 3/2001 | Huang et al. |
| 6,203,026 B1 | 3/2001 | Jones |
| 6,213,263 B1 | 4/2001 | De Frenne |
| 6,215,217 B1 | 4/2001 | Kurosawa et al. |
| 6,216,078 B1 | 4/2001 | Jinbo et al. |
| 6,217,049 B1 | 4/2001 | Becker |
| 6,219,045 B1 | 4/2001 | Leahy et al. |
| 6,244,398 B1 | 6/2001 | Girvin et al. |
| 6,254,067 B1 | 7/2001 | Yih |
| 6,279,702 B1 | 8/2001 | Koh |
| 6,283,462 B1 | 9/2001 | Emmert |
| 6,290,034 B1 | 9/2001 | Ichimaru |
| 6,293,530 B1 | 9/2001 | Delorenzis et al. |
| 6,296,091 B1 | 10/2001 | Hamilton |
| 6,296,092 B1 | 10/2001 | Marking et al. |
| 6,311,962 B1 | 11/2001 | Marking |
| 6,318,525 B1 | 11/2001 | Mgnocchi et al. |
| 6,321,888 B1 | 11/2001 | Reybrouck et al. |
| 6,322,468 B1 | 11/2001 | Wing et al. |
| 6,336,648 B1 | 1/2002 | Bohn |
| 6,343,807 B1 | 2/2002 | Rathbun |
| 6,352,144 B1 | 3/2002 | Brooks et al. |
| 6,359,837 B1 | 3/2002 | Tsukamoto et al. |
| 6,360,857 B1 | 3/2002 | Fox et al. |
| 6,371,262 B1 | 4/2002 | Katou et al. |
| 6,371,267 B1 | 4/2002 | Kao et al. |
| 6,378,816 B1 | 4/2002 | Pfister |
| 6,378,885 B1 | 4/2002 | Ellsworth et al. |
| 6,382,370 B1 | 5/2002 | Girvin |
| 6,389,341 B1 | 5/2002 | Davis |
| 6,390,747 B1 | 5/2002 | Commins |
| 6,394,238 B1 | 5/2002 | Rogala |
| 6,401,883 B1 | 6/2002 | Nyce et al. |
| 6,412,788 B1 | 7/2002 | Ichimaru |
| 6,415,895 B2 | 7/2002 | Marking et al. |
| 6,418,360 B1 | 7/2002 | Spivey et al. |
| 6,427,812 B2 | 8/2002 | Crawley et al. |
| 6,431,573 B1 | 8/2002 | Lerman et al. |
| 6,434,460 B1 | 8/2002 | Uchino et al. |
| 6,446,771 B1 | 9/2002 | Sintorn et al. |
| 6,458,060 B1 | 10/2002 | Watterson et al. |
| 6,460,567 B1 | 10/2002 | Hansen et al. |
| 6,467,593 B1 | 10/2002 | Corradini et al. |
| 6,474,454 B2 | 11/2002 | Matsumoto et al. |
| 6,474,753 B1 | 11/2002 | Rieth et al. |
| 6,501,554 B1 | 12/2002 | Hackney et al. |
| 6,502,837 B1 | 1/2003 | Hamilton et al. |
| 6,510,929 B1 | 1/2003 | Gordaninejad et al. |
| 6,520,297 B1 | 2/2003 | Lumpkin et al. |
| 6,527,093 B2 | 3/2003 | Oliver et al. |
| 6,539,336 B1 | 3/2003 | Vock et al. |
| 6,592,136 B2 | 7/2003 | Becker et al. |
| 6,604,751 B2 | 8/2003 | Fox |
| 6,609,686 B2 | 8/2003 | Malizia |
| 6,619,615 B1 | 9/2003 | Mayr et al. |
| 6,623,389 B1 | 9/2003 | Campagnolo |
| 6,648,109 B2 | 11/2003 | Farr et al. |
| 6,651,788 B1 | 11/2003 | Wohlfarth |
| 6,659,240 B2 | 12/2003 | Dernebo |
| 6,659,241 B2 | 12/2003 | Sendrea |
| 6,672,687 B2 | 1/2004 | Nishio |
| 6,676,119 B2 | 1/2004 | Becker et al. |
| 6,691,991 B1 | 2/2004 | Huang |
| 6,701,234 B1 | 3/2004 | Vogelsang et al. |
| 6,722,678 B2 | 4/2004 | Mcandrews |
| 6,732,033 B2 | 5/2004 | Laplante et al. |
| 6,755,113 B2 | 6/2004 | Shih |
| 6,782,980 B2 | 8/2004 | Nakadate |
| 6,814,348 B1 | 11/2004 | Leben et al. |
| 6,817,454 B2 | 11/2004 | Nezu et al. |
| 6,827,184 B1 | 12/2004 | Lin |
| 6,837,827 B1 | 1/2005 | Lee et al. |
| 6,840,257 B2 | 1/2005 | Dario et al. |
| 6,853,955 B1 | 2/2005 | Burrell et al. |
| 6,857,625 B2 | 2/2005 | Löser et al. |
| 6,863,291 B2 | 3/2005 | Miyoshi |
| 6,883,650 B2 | 4/2005 | Van Wonderen et al. |
| 6,902,513 B1 | 6/2005 | Mcclure et al. |
| 6,905,203 B2 | 6/2005 | Kremers et al. |
| 6,920,951 B2 | 7/2005 | Song et al. |
| 6,921,351 B1 | 7/2005 | Hickman et al. |
| 6,923,853 B2 | 8/2005 | Kremers et al. |
| 6,931,958 B2 | 8/2005 | Takeda |
| 6,935,157 B2 | 8/2005 | Miller |
| 6,952,060 B2 | 10/2005 | Goldner et al. |
| 6,959,906 B2 | 11/2005 | Hoenig et al. |
| 6,959,921 B2 | 11/2005 | Rose |
| 6,966,412 B2 | 11/2005 | Braswell et al. |
| 6,978,871 B2 | 12/2005 | Holiviers |
| 6,978,872 B2 | 12/2005 | Turner |
| 6,991,076 B2 | 1/2006 | Mcandrews |
| 7,025,367 B2 | 4/2006 | Mckinnon et al. |
| 7,076,351 B2 | 7/2006 | Hamilton et al. |
| 7,128,192 B2 | 10/2006 | Fox |
| 7,128,693 B2 | 10/2006 | Brown et al. |
| 7,135,794 B2 | 11/2006 | Kühnel |

(56) References Cited

U.S. PATENT DOCUMENTS

| | | |
|---|---|---|
| 7,147,207 B2 | 12/2006 | Jordan et al. |
| 7,163,222 B2 | 1/2007 | Becker et al. |
| 7,166,062 B1 | 1/2007 | Watterson et al. |
| 7,166,064 B2 | 1/2007 | Ashby et al. |
| 7,204,466 B2 | 4/2007 | Hsieh |
| 7,207,912 B2 | 4/2007 | Takeda et al. |
| 7,208,845 B2 | 4/2007 | Schaefer et al. |
| 7,217,224 B2 | 5/2007 | Thomas |
| 7,234,574 B2 | 6/2007 | Matsunaga et al. |
| 7,234,575 B2 | 6/2007 | Anderfaas et al. |
| 7,234,680 B2 | 6/2007 | Hull et al. |
| 7,243,763 B2 | 7/2007 | Carlson |
| 7,255,210 B2 | 8/2007 | Larsson et al. |
| 7,270,221 B2 | 9/2007 | Mcandrews |
| 7,270,222 B1 | 9/2007 | Aymar et al. |
| 7,287,760 B1 | 10/2007 | Quick et al. |
| 7,288,038 B2 | 10/2007 | Takeda et al. |
| 7,289,138 B2 | 10/2007 | Foote et al. |
| 7,292,867 B2 | 11/2007 | Werner et al. |
| 7,293,764 B2 | 11/2007 | Fang |
| 7,299,112 B2 | 11/2007 | Laplante et al. |
| 7,302,961 B2 | 12/2007 | Martin et al. |
| 7,306,206 B2 | 12/2007 | Turner |
| 7,316,406 B2 | 1/2008 | Kimura et al. |
| 7,320,387 B2 | 1/2008 | Sendrea |
| 7,325,660 B2 | 2/2008 | Norgaard et al. |
| 7,363,129 B1 | 4/2008 | Barnicle et al. |
| 7,373,232 B2 | 5/2008 | Guderzo |
| 7,374,028 B2 | 5/2008 | Fox |
| 7,397,355 B2 | 7/2008 | Tracy |
| 7,413,062 B2 | 8/2008 | Vandewal |
| 7,413,063 B1 | 8/2008 | Davis |
| 7,415,336 B1 | 8/2008 | Burch et al. |
| 7,422,092 B2 | 9/2008 | Hitchcock et al. |
| 7,441,638 B2 | 10/2008 | Hanawa |
| 7,469,910 B2 | 12/2008 | Münster et al. |
| 7,484,603 B2 | 2/2009 | Fox |
| 7,490,705 B2 | 2/2009 | Fox |
| 7,512,520 B2 | 3/2009 | Sack et al. |
| 7,513,490 B2 | 4/2009 | Robertson |
| 7,523,617 B2 | 4/2009 | Colpitts et al. |
| 7,558,313 B2 | 7/2009 | Feher |
| 7,558,574 B2 | 7/2009 | Feher et al. |
| 7,566,290 B2 | 7/2009 | Lee et al. |
| 7,569,952 B1 | 8/2009 | Bono et al. |
| 7,581,743 B2 | 9/2009 | Graney et al. |
| 7,591,352 B2 | 9/2009 | Hanawa |
| 7,600,616 B2 | 10/2009 | Anderfaas et al. |
| 7,628,259 B2 | 12/2009 | Norgaard et al. |
| 7,628,414 B2 | 12/2009 | Dobson et al. |
| 7,631,882 B2 | 12/2009 | Hirao et al. |
| 7,654,369 B2 | 2/2010 | Murray et al. |
| 7,673,936 B2 | 3/2010 | Hsu et al. |
| 7,684,911 B2 | 3/2010 | Seifert et al. |
| 7,694,785 B2 | 4/2010 | Nakadate |
| 7,694,987 B2 | 4/2010 | Mcandrews |
| 7,699,753 B2 | 4/2010 | Daikeler et al. |
| 7,703,585 B2 | 4/2010 | Fox |
| 7,722,056 B2 | 5/2010 | Inoue et al. |
| 7,722,069 B2 | 5/2010 | Shirai |
| 7,726,042 B2 | 6/2010 | Meschan |
| 7,730,906 B2 | 6/2010 | Kleinert et al. |
| 7,736,272 B2 | 6/2010 | Martens |
| 7,744,097 B2 | 6/2010 | Noguchi |
| 7,764,990 B2 | 7/2010 | Martikka et al. |
| 7,766,794 B2 | 8/2010 | Oliver et al. |
| 7,770,701 B1 | 8/2010 | Davis |
| 7,775,128 B2 | 8/2010 | Roessingh et al. |
| 7,779,974 B2 | 8/2010 | Timoney et al. |
| 7,795,711 B2 | 9/2010 | Sauciuc et al. |
| 7,822,522 B2 | 10/2010 | Wereley et al. |
| 7,828,125 B2 | 11/2010 | Sekiya et al. |
| 7,828,126 B2 | 11/2010 | Lun |
| 7,837,213 B2 | 11/2010 | Colegrove et al. |
| 7,840,346 B2 | 11/2010 | Huhtala et al. |
| 7,841,258 B2 | 11/2010 | Komatsu et al. |
| 7,845,602 B1 | 12/2010 | Young et al. |
| 7,857,325 B2 | 12/2010 | Copsey et al. |
| 7,872,764 B2 | 1/2011 | Higgins-Luthman et al. |
| 7,874,567 B2 | 1/2011 | Ichida et al. |
| 7,901,292 B1 | 3/2011 | Uhlir et al. |
| 7,909,348 B2 | 3/2011 | Klieber et al. |
| 7,927,253 B2 | 4/2011 | Dibenedetto et al. |
| 7,931,132 B2 | 4/2011 | Braun |
| 7,931,563 B2 | 4/2011 | Shaw et al. |
| 7,946,163 B2 | 5/2011 | Gartner |
| 7,975,814 B2 | 7/2011 | Soederdahl |
| 8,016,349 B2 | 9/2011 | Mouri et al. |
| 8,021,270 B2 | 9/2011 | D'Eredita |
| 8,042,427 B2 | 10/2011 | Kawakami et al. |
| 8,056,392 B2 | 11/2011 | Ryan et al. |
| 8,069,964 B2 | 12/2011 | Deferme et al. |
| 8,087,676 B2 | 1/2012 | Mcintyre |
| 8,091,910 B2 | 1/2012 | Hara et al. |
| 8,104,591 B2 | 1/2012 | Barefoot et al. |
| 8,121,757 B2 | 2/2012 | Extance et al. |
| 8,121,785 B2 | 2/2012 | Swisher et al. |
| 8,127,900 B2 | 3/2012 | Inoue |
| 8,136,877 B2 | 3/2012 | Walsh et al. |
| 8,141,438 B2 | 3/2012 | Roessingh et al. |
| 8,151,952 B2 | 4/2012 | Lenz et al. |
| 8,157,629 B2 | 4/2012 | Yanke et al. |
| 8,191,964 B2 | 6/2012 | Hsu et al. |
| 8,201,476 B2 | 6/2012 | Tsumiyama |
| 8,205,864 B2 | 6/2012 | Michel |
| 8,210,106 B2 | 7/2012 | Tai et al. |
| 8,210,330 B2 | 7/2012 | Vandewal |
| 8,246,065 B1 | 8/2012 | Kodama et al. |
| 8,256,587 B2 | 9/2012 | Bakke et al. |
| 8,256,732 B1 | 9/2012 | Young et al. |
| 8,262,058 B2 | 9/2012 | Kot |
| 8,262,062 B2 | 9/2012 | Kamo et al. |
| 8,262,100 B2 | 9/2012 | Thomas |
| 8,265,825 B2 | 9/2012 | Kajino et al. |
| 8,285,447 B2 | 10/2012 | Bennett et al. |
| 8,286,982 B2 | 10/2012 | Plantet et al. |
| 8,291,889 B2 | 10/2012 | Shafer et al. |
| 8,292,274 B2 | 10/2012 | Adoline et al. |
| 8,307,965 B2 | 11/2012 | Föster et al. |
| 8,308,124 B2 | 11/2012 | Hsu |
| 8,317,261 B2 | 11/2012 | Walsh et al. |
| 8,321,177 B2 | 11/2012 | Sack et al. |
| 8,322,497 B2 | 12/2012 | Marjoram et al. |
| 8,328,454 B2 | 12/2012 | Mcandrews et al. |
| 8,336,683 B2 | 12/2012 | Mcandrews et al. |
| 8,364,389 B2 | 1/2013 | Dorogusker et al. |
| 8,393,446 B2 | 3/2013 | Haugen |
| 8,413,773 B2 | 4/2013 | Anderfaas et al. |
| 8,423,244 B2 | 4/2013 | Proemm et al. |
| 8,430,770 B2 | 4/2013 | Dugan et al. |
| 8,458,080 B2 | 6/2013 | Shirai |
| 8,459,619 B2 | 6/2013 | Trinh et al. |
| 8,480,064 B2 | 7/2013 | Talavasek |
| 8,495,947 B2 | 7/2013 | Hata |
| 8,550,223 B2 | 10/2013 | Cox et al. |
| 8,550,551 B2 | 10/2013 | Shirai |
| 8,556,048 B2 | 10/2013 | Maeda et al. |
| 8,556,049 B2 | 10/2013 | Jee |
| 8,596,663 B2 | 12/2013 | Shirai et al. |
| 8,616,351 B2 | 12/2013 | Roessle et al. |
| 8,622,180 B2 | 1/2014 | Wootten et al. |
| 8,627,930 B2 | 1/2014 | Smith et al. |
| 8,627,932 B2 | 1/2014 | Marking |
| 8,641,073 B2 | 2/2014 | Lee et al. |
| 8,651,251 B2 | 2/2014 | Preukschat et al. |
| 8,655,548 B2 | 2/2014 | Ichida et al. |
| 8,684,367 B2 | 4/2014 | Haugen |
| 8,727,947 B2 | 5/2014 | Tagliabue |
| 8,744,699 B2 | 6/2014 | Yamaguchi et al. |
| 8,752,682 B2 | 6/2014 | Park et al. |
| 8,763,770 B2 | 7/2014 | Marking |
| 8,770,357 B2 | 7/2014 | Sims et al. |
| 8,781,680 B2 | 7/2014 | Ichida et al. |
| 8,781,690 B2 | 7/2014 | Hara et al. |

(56) References Cited

U.S. PATENT DOCUMENTS

| | | |
|---|---|---|
| 8,814,109 B2 | 8/2014 | Calendrille et al. |
| 8,833,786 B2 | 9/2014 | Camp et al. |
| 8,838,335 B2 | 9/2014 | Bass et al. |
| 8,845,496 B2 | 9/2014 | Arrasvuori et al. |
| 8,857,580 B2 | 10/2014 | Marking |
| 8,868,253 B2 | 10/2014 | Hashimoto et al. |
| 8,888,115 B2 | 11/2014 | Chubbuck et al. |
| 8,909,424 B2 | 12/2014 | Jordan et al. |
| 8,935,036 B1 | 1/2015 | Christensen et al. |
| 8,936,139 B2 | 1/2015 | Galasso et al. |
| 8,950,771 B2 | 2/2015 | Felsl et al. |
| 8,955,653 B2 | 2/2015 | Marking |
| 8,967,343 B2 | 3/2015 | Battlogg et al. |
| 8,985,594 B2 | 3/2015 | Yabumoto |
| 8,991,571 B2 | 3/2015 | Murakami |
| 9,033,122 B2* | 5/2015 | Ericksen ............... F16F 9/465 188/282.4 |
| 9,038,791 B2 | 5/2015 | Marking |
| 9,047,778 B1 | 6/2015 | Cazanas et al. |
| 9,057,416 B2 | 6/2015 | Talavasek |
| 9,073,592 B2 | 7/2015 | Hsu |
| 9,103,400 B2 | 8/2015 | Becker |
| 9,108,098 B2 | 8/2015 | Galasso et al. |
| 9,120,362 B2 | 9/2015 | Marking |
| 9,126,647 B2 | 9/2015 | Kuo |
| 9,140,325 B2 | 9/2015 | Cox et al. |
| 9,157,523 B2 | 10/2015 | Miki et al. |
| 9,186,949 B2 | 11/2015 | Galasso et al. |
| 9,194,456 B2 | 11/2015 | Laird et al. |
| 9,199,690 B2 | 12/2015 | Watarai |
| 9,217,482 B2 | 12/2015 | Schürmann et al. |
| 9,229,712 B2 | 1/2016 | Takamoto et al. |
| 9,239,090 B2 | 1/2016 | Marking et al. |
| 9,278,598 B2 | 3/2016 | Galasso et al. |
| 9,303,712 B2 | 4/2016 | Cox |
| 9,353,818 B2 | 5/2016 | Marking |
| 9,366,307 B2 | 6/2016 | Marking |
| 9,415,659 B2 | 8/2016 | Kikuchi et al. |
| 9,422,018 B2 | 8/2016 | Pelot et al. |
| 9,422,025 B2 | 8/2016 | Pezzi et al. |
| 9,452,654 B2 | 9/2016 | Ericksen et al. |
| 9,523,406 B2 | 12/2016 | Galasso et al. |
| 9,528,565 B2 | 12/2016 | Marking |
| 9,550,405 B2 | 1/2017 | Marking et al. |
| 9,556,925 B2 | 1/2017 | Marking |
| 9,616,728 B2 | 4/2017 | Marking |
| 9,650,094 B2 | 5/2017 | Laird et al. |
| 9,663,181 B2* | 5/2017 | Ericksen ............... B62K 25/08 |
| 9,682,604 B2 | 6/2017 | Cox et al. |
| 9,765,842 B2 | 9/2017 | Noguchi |
| 9,784,333 B2 | 10/2017 | Marking |
| 9,810,282 B2 | 11/2017 | Roessle et al. |
| 9,975,598 B2 | 5/2018 | Bender et al. |
| 10,012,282 B2 | 7/2018 | Kimura et al. |
| 10,029,172 B2 | 7/2018 | Galasso et al. |
| 10,036,443 B2 | 7/2018 | Galasso et al. |
| 10,040,328 B2 | 8/2018 | Marking |
| 10,040,329 B2 | 8/2018 | Ericksen et al. |
| 10,047,817 B2* | 8/2018 | Ericksen ............ B60G 17/01908 |
| 10,054,185 B2 | 8/2018 | Cox |
| 10,072,724 B2 | 9/2018 | Haugen et al. |
| 10,086,670 B2 | 10/2018 | Galasso et al. |
| 10,089,868 B1 | 10/2018 | Hayward |
| 10,094,443 B2 | 10/2018 | Marking |
| 10,145,435 B2 | 12/2018 | Galasso et al. |
| 10,160,511 B2* | 12/2018 | Ericksen ............... B62K 25/08 |
| 10,180,171 B2 | 1/2019 | Laird et al. |
| 10,330,171 B2 | 6/2019 | Cox et al. |
| 10,336,148 B2 | 7/2019 | Ericksen et al. |
| 10,336,149 B2 | 7/2019 | Ericksen et al. |
| 10,400,847 B2 | 9/2019 | Marking |
| 10,406,883 B2 | 9/2019 | Marking |
| 10,415,662 B2 | 9/2019 | Marking |
| 10,443,671 B2 | 10/2019 | Marking |
| 10,473,179 B2 | 11/2019 | Ripa |
| 10,550,909 B2 | 2/2020 | Haugen |
| 10,591,015 B2 | 3/2020 | Galasso et al. |
| 10,604,207 B2 | 3/2020 | Winefordner et al. |
| 10,670,106 B2* | 6/2020 | Ericksen ............ B60G 17/01908 |
| 10,677,309 B2 | 6/2020 | Ericksen et al. |
| 10,697,514 B2 | 6/2020 | Marking |
| 10,718,397 B2 | 7/2020 | Marking |
| 10,723,409 B2* | 7/2020 | Ericksen ............... B60G 17/08 |
| 10,737,546 B2 | 8/2020 | Tong |
| 10,759,247 B2 | 9/2020 | Galasso et al. |
| 10,933,709 B2 | 3/2021 | Shaw et al. |
| 10,933,936 B2 | 3/2021 | Sonderegger et al. |
| 11,162,555 B2 | 11/2021 | Haugen |
| 11,279,198 B2 | 3/2022 | Marking |
| 11,299,233 B2* | 4/2022 | Ericksen ............... F16F 9/465 |
| 11,472,252 B2 | 10/2022 | Tong |
| 11,473,644 B2 | 10/2022 | Hansson |
| 11,519,477 B2 | 12/2022 | Marking |
| 11,549,565 B2* | 1/2023 | Ericksen ............ B60G 17/01908 |
| 11,708,878 B2* | 7/2023 | Marking ............... F16F 9/468 188/266.2 |
| 11,866,120 B2* | 1/2024 | Ericksen ............... F16F 9/465 |
| 11,920,655 B2 | 3/2024 | Galasso et al. |
| 11,958,328 B2 | 4/2024 | Galasso et al. |
| 2001/0017334 A1 | 8/2001 | Vincent |
| 2001/0022621 A1 | 9/2001 | Squibbs |
| 2001/0030408 A1 | 10/2001 | Miyoshi et al. |
| 2001/0042663 A1 | 11/2001 | Marking et al. |
| 2001/0055373 A1 | 12/2001 | Yamashita |
| 2002/0000352 A1 | 1/2002 | Matsumoto et al. |
| 2002/0032508 A1 | 3/2002 | Uchino et al. |
| 2002/0045987 A1 | 4/2002 | Ohata et al. |
| 2002/0050112 A1 | 5/2002 | Koch et al. |
| 2002/0050518 A1 | 5/2002 | Roustaei |
| 2002/0053493 A1 | 5/2002 | Sintorn et al. |
| 2002/0055422 A1 | 5/2002 | Airmet et al. |
| 2002/0063469 A1 | 5/2002 | Nishio |
| 2002/0089107 A1 | 7/2002 | Koh |
| 2002/0095979 A1 | 7/2002 | Shirato et al. |
| 2002/0113347 A1 | 8/2002 | Robbins et al. |
| 2002/0121416 A1 | 9/2002 | Katayama et al. |
| 2002/0130000 A1 | 9/2002 | Lisenker et al. |
| 2002/0130003 A1 | 9/2002 | Lisenker et al. |
| 2002/0180166 A1 | 12/2002 | Voss |
| 2002/0185581 A1 | 12/2002 | Trask et al. |
| 2002/0187867 A1 | 12/2002 | Ichida et al. |
| 2003/0001346 A1 | 1/2003 | Hamilton et al. |
| 2003/0001358 A1 | 1/2003 | Becker et al. |
| 2003/0034697 A1 | 2/2003 | Goldner et al. |
| 2003/0040348 A1 | 2/2003 | Martens et al. |
| 2003/0051954 A1 | 3/2003 | Sendrea |
| 2003/0054327 A1 | 3/2003 | Evensen et al. |
| 2003/0065430 A1 | 4/2003 | Lu et al. |
| 2003/0075403 A1 | 4/2003 | Dernebo |
| 2003/0103651 A1 | 6/2003 | Novak |
| 2003/0128275 A1 | 7/2003 | Maguire |
| 2003/0160369 A1 | 8/2003 | Laplante et al. |
| 2003/0191567 A1 | 10/2003 | Gentilcore |
| 2003/0216845 A1 | 11/2003 | Williston |
| 2004/0004659 A1 | 1/2004 | Foote et al. |
| 2004/0017455 A1 | 1/2004 | Kremers et al. |
| 2004/0021754 A1 | 2/2004 | Kremers et al. |
| 2004/0075350 A1 | 4/2004 | Kuhnel |
| 2004/0091111 A1 | 5/2004 | Levy et al. |
| 2004/0099312 A1 | 5/2004 | Boyer et al. |
| 2004/0103146 A1 | 5/2004 | Park |
| 2004/0172178 A1 | 9/2004 | Takeda et al. |
| 2004/0208687 A1 | 10/2004 | Sicz et al. |
| 2004/0220708 A1 | 11/2004 | Owen et al. |
| 2004/0220712 A1 | 11/2004 | Takeda et al. |
| 2004/0222056 A1 | 11/2004 | Fox |
| 2004/0256778 A1 | 12/2004 | Verriet |
| 2005/0008992 A1 | 1/2005 | Westergaard et al. |
| 2005/0055156 A1 | 3/2005 | Maltagliati et al. |
| 2005/0056507 A1 | 3/2005 | Molina et al. |
| 2005/0077131 A1 | 4/2005 | Russell |
| 2005/0098401 A1 | 5/2005 | Hamilton et al. |
| 2005/0104320 A1 | 5/2005 | Wesling et al. |
| 2005/0107216 A1 | 5/2005 | Lee et al. |

(56) References Cited

U.S. PATENT DOCUMENTS

| | | |
|---|---|---|
| 2005/0110229 A1 | 5/2005 | Kimura et al. |
| 2005/0121269 A1 | 6/2005 | Namuduri |
| 2005/0173849 A1 | 8/2005 | Vandewal |
| 2005/0195094 A1 | 9/2005 | White |
| 2005/0199455 A1 | 9/2005 | Browne et al. |
| 2005/0216186 A1 | 9/2005 | Dorfman et al. |
| 2005/0227798 A1 | 10/2005 | Ichida et al. |
| 2005/0239601 A1 | 10/2005 | Thomas |
| 2005/0288154 A1 | 12/2005 | Lee et al. |
| 2006/0040793 A1 | 2/2006 | Martens et al. |
| 2006/0064223 A1 | 3/2006 | Voss |
| 2006/0065496 A1 | 3/2006 | Fox |
| 2006/0066074 A1 | 3/2006 | Turner et al. |
| 2006/0076757 A1 | 4/2006 | Bromley |
| 2006/0081431 A1 | 4/2006 | Breese et al. |
| 2006/0096817 A1 | 5/2006 | Norgaard et al. |
| 2006/0113834 A1 | 6/2006 | Hanawa |
| 2006/0120080 A1 | 6/2006 | Sipinski et al. |
| 2006/0124414 A1 | 6/2006 | Hanawa |
| 2006/0136173 A1 | 6/2006 | Case et al. |
| 2006/0137934 A1 | 6/2006 | Kurth |
| 2006/0137947 A1 | 6/2006 | Fujita |
| 2006/0144311 A1 | 7/2006 | Heyring et al. |
| 2006/0163551 A1 | 7/2006 | Coenen et al. |
| 2006/0163787 A1 | 7/2006 | Munster et al. |
| 2006/0175792 A1 | 8/2006 | Sicz et al. |
| 2006/0176216 A1 | 8/2006 | Hipskind |
| 2006/0181034 A1 | 8/2006 | Wilde et al. |
| 2006/0185951 A1 | 8/2006 | Tanaka |
| 2006/0213082 A1 | 9/2006 | Meschan |
| 2006/0219503 A1 | 10/2006 | Kim |
| 2006/0225976 A1 | 10/2006 | Nakadate |
| 2006/0225979 A1 | 10/2006 | Quinn et al. |
| 2006/0231359 A1 | 10/2006 | Matsunaga et al. |
| 2006/0237272 A1 | 10/2006 | Huang |
| 2006/0253210 A1 | 11/2006 | Rosenberg |
| 2006/0254365 A1 | 11/2006 | Hamel |
| 2006/0265144 A1 | 11/2006 | Frolik |
| 2006/0289258 A1 | 12/2006 | Fox |
| 2007/0006489 A1 | 1/2007 | Case et al. |
| 2007/0007743 A1 | 1/2007 | Becker et al. |
| 2007/0008096 A1 | 1/2007 | Tracy |
| 2007/0021885 A1 | 1/2007 | Soehren |
| 2007/0021886 A1 | 1/2007 | Miyajima |
| 2007/0032981 A1 | 2/2007 | Merkel et al. |
| 2007/0034464 A1 | 2/2007 | Barefoot |
| 2007/0039790 A1 | 2/2007 | Timoney et al. |
| 2007/0051573 A1 | 3/2007 | Norgaard et al. |
| 2007/0070069 A1 | 3/2007 | Samarasekera et al. |
| 2007/0080515 A1 | 4/2007 | Mcandrews et al. |
| 2007/0088475 A1 | 4/2007 | Nordgren et al. |
| 2007/0090518 A1 | 4/2007 | Sauciuc et al. |
| 2007/0119669 A1 | 5/2007 | Anderfaas et al. |
| 2007/0170688 A1 | 7/2007 | Watson |
| 2007/0199401 A1 | 8/2007 | Kawakami et al. |
| 2007/0213126 A1 | 9/2007 | Deutsch et al. |
| 2007/0213150 A1 | 9/2007 | Chattin et al. |
| 2007/0221054 A1 | 9/2007 | Webster et al. |
| 2007/0239479 A1 | 10/2007 | Arrasvuori et al. |
| 2007/0260372 A1 | 11/2007 | Langer |
| 2007/0272458 A1 | 11/2007 | Taniguchi et al. |
| 2008/0006494 A1 | 1/2008 | Vandewal |
| 2008/0009992 A1 | 1/2008 | Izawa et al. |
| 2008/0015089 A1 | 1/2008 | Hurwitz et al. |
| 2008/0018065 A1 | 1/2008 | Hirao et al. |
| 2008/0029730 A1 | 2/2008 | Kamo et al. |
| 2008/0041677 A1 | 2/2008 | Namuduri |
| 2008/0059025 A1 | 3/2008 | Furuichi et al. |
| 2008/0067019 A1 | 3/2008 | Jensen et al. |
| 2008/0093820 A1 | 4/2008 | Mcandrews |
| 2008/0096726 A1 | 4/2008 | Riley et al. |
| 2008/0099968 A1 | 5/2008 | Schroeder |
| 2008/0108465 A1 | 5/2008 | Ichida |
| 2008/0109158 A1 | 5/2008 | Huhtala et al. |
| 2008/0114239 A1 | 5/2008 | Randall et al. |
| 2008/0116622 A1 | 5/2008 | Fox |
| 2008/0119330 A1 | 5/2008 | Chiang et al. |
| 2008/0162009 A1 | 7/2008 | Miki et al. |
| 2008/0163718 A1 | 7/2008 | Chiang |
| 2008/0170130 A1 | 7/2008 | Ollila et al. |
| 2008/0185244 A1 | 8/2008 | Maeda et al. |
| 2008/0200310 A1 | 8/2008 | Tagliabue |
| 2008/0203631 A1 | 8/2008 | Gartner et al. |
| 2008/0250844 A1 | 10/2008 | Gartner |
| 2008/0254944 A1 | 10/2008 | Muri et al. |
| 2008/0290618 A1 | 11/2008 | Yanaka et al. |
| 2008/0303320 A1 | 12/2008 | Schranz et al. |
| 2008/0312799 A1 | 12/2008 | Miglioranza |
| 2008/0314706 A1 | 12/2008 | Lun et al. |
| 2009/0000885 A1 | 1/2009 | Mcandrews |
| 2009/0001684 A1 | 1/2009 | Mcandrews et al. |
| 2009/0020382 A1 | 1/2009 | Van Weelden et al. |
| 2009/0038427 A1 | 2/2009 | Watarai |
| 2009/0038897 A1 | 2/2009 | Murakami |
| 2009/0048070 A1 | 2/2009 | Mncent et al. |
| 2009/0069972 A1 | 3/2009 | Templeton et al. |
| 2009/0070037 A1 | 3/2009 | Templeton et al. |
| 2009/0071772 A1 | 3/2009 | Cho et al. |
| 2009/0071773 A1 | 3/2009 | Lun |
| 2009/0098981 A1 | 4/2009 | Del et al. |
| 2009/0102628 A1 | 4/2009 | Takebayashi |
| 2009/0118100 A1 | 5/2009 | Oliver et al. |
| 2009/0121398 A1 | 5/2009 | Inoue |
| 2009/0131224 A1 | 5/2009 | Yuen |
| 2009/0138157 A1 | 5/2009 | Hagglund et al. |
| 2009/0140501 A1 | 6/2009 | Taylor et al. |
| 2009/0171532 A1 | 7/2009 | Ryan et al. |
| 2009/0192673 A1 | 7/2009 | Song et al. |
| 2009/0200126 A1 | 8/2009 | Kondo et al. |
| 2009/0200127 A1 | 8/2009 | Janes |
| 2009/0200760 A1 | 8/2009 | Gartner et al. |
| 2009/0236807 A1 | 9/2009 | Wootten et al. |
| 2009/0258710 A1 | 10/2009 | Quatrochi et al. |
| 2009/0261542 A1 | 10/2009 | Mcintyre |
| 2009/0277734 A1 | 11/2009 | Cox et al. |
| 2009/0277736 A1 | 11/2009 | Mcandrews et al. |
| 2009/0288924 A1 | 11/2009 | Murray et al. |
| 2009/0294231 A1 | 12/2009 | Carlson et al. |
| 2009/0302558 A1 | 12/2009 | Shirai |
| 2009/0314592 A1 | 12/2009 | Nygren |
| 2009/0324327 A1 | 12/2009 | Mcandrews et al. |
| 2010/0004097 A1 | 1/2010 | D'Eredita |
| 2010/0010709 A1 | 1/2010 | Song |
| 2010/0025946 A1 | 2/2010 | Inoue et al. |
| 2010/0032254 A1 | 2/2010 | Anderfaas et al. |
| 2010/0044975 A1 | 2/2010 | Yablon et al. |
| 2010/0059964 A1 | 3/2010 | Morris |
| 2010/0066051 A1 | 3/2010 | Haugen |
| 2010/0109277 A1 | 5/2010 | Furrer |
| 2010/0133764 A1 | 6/2010 | Greaves |
| 2010/0139442 A1 | 6/2010 | Tsumiyama |
| 2010/0147640 A1 | 6/2010 | Jones et al. |
| 2010/0160014 A1 | 6/2010 | Galasso et al. |
| 2010/0164705 A1 | 7/2010 | Blanchard |
| 2010/0170760 A1 | 7/2010 | Marking |
| 2010/0186836 A1 | 7/2010 | Yoshihiro et al. |
| 2010/0198453 A1 | 8/2010 | Dorogusker et al. |
| 2010/0207351 A1 | 8/2010 | Klieber et al. |
| 2010/0224454 A1 | 9/2010 | Chen et al. |
| 2010/0244340 A1 | 9/2010 | Wootten et al. |
| 2010/0252972 A1 | 10/2010 | Cox et al. |
| 2010/0271191 A1 | 10/2010 | De Graff et al. |
| 2010/0276238 A1 | 11/2010 | Crasset |
| 2010/0276906 A1 | 11/2010 | Galasso et al. |
| 2010/0308516 A1 | 12/2010 | Galasso et al. |
| 2010/0308628 A1 | 12/2010 | Hsu et al. |
| 2010/0314917 A1 | 12/2010 | Hsieh et al. |
| 2010/0324781 A1 | 12/2010 | Gagliano |
| 2010/0326780 A1 | 12/2010 | Murakami |
| 2010/0327542 A1 | 12/2010 | Hara et al. |
| 2010/0332079 A1 | 12/2010 | Wang et al. |
| 2011/0022266 A1 | 1/2011 | Ippolito et al. |
| 2011/0035105 A1 | 2/2011 | Jolly |
| 2011/0067965 A1 | 3/2011 | Mcandrews |

(56) References Cited

U.S. PATENT DOCUMENTS

| | | |
|---|---|---|
| 2011/0086686 A1 | 4/2011 | Avent et al. |
| 2011/0095507 A1 | 4/2011 | Plantet et al. |
| 2011/0097139 A1 | 4/2011 | Hsu et al. |
| 2011/0109060 A1 | 5/2011 | Earle et al. |
| 2011/0127706 A1 | 6/2011 | Sims et al. |
| 2011/0154939 A1 | 6/2011 | Watarai et al. |
| 2011/0174582 A1 | 7/2011 | Wootten et al. |
| 2011/0202236 A1 | 8/2011 | Galasso et al. |
| 2011/0204201 A1 | 8/2011 | Kodama et al. |
| 2011/0214956 A1 | 9/2011 | Marking |
| 2011/0224901 A1 | 9/2011 | Aben et al. |
| 2011/0232147 A1 | 9/2011 | Zoellner et al. |
| 2011/0257848 A1 | 10/2011 | Shirai |
| 2011/0284333 A1 | 11/2011 | Krog et al. |
| 2011/0315494 A1 | 12/2011 | Marking |
| 2012/0006949 A1 | 1/2012 | Laird et al. |
| 2012/0007327 A1 | 1/2012 | Talavasek |
| 2012/0018263 A1 | 1/2012 | Marking |
| 2012/0018264 A1 | 1/2012 | King |
| 2012/0048665 A1 | 3/2012 | Marking |
| 2012/0074660 A1 | 3/2012 | Thomas |
| 2012/0080279 A1 | 4/2012 | Galasso et al. |
| 2012/0136537 A1 | 5/2012 | Galasso et al. |
| 2012/0166044 A1 | 6/2012 | Battlogg et al. |
| 2012/0181126 A1 | 7/2012 | De Kock |
| 2012/0221228 A1 | 8/2012 | Noumura et al. |
| 2012/0222927 A1 | 9/2012 | Marking |
| 2012/0228906 A1 | 9/2012 | Mcandrews et al. |
| 2012/0253599 A1 | 10/2012 | Shirai |
| 2012/0253600 A1 | 10/2012 | Ichida et al. |
| 2012/0265414 A1 | 10/2012 | Cheng |
| 2012/0274043 A1 | 11/2012 | Lee et al. |
| 2012/0305350 A1 | 12/2012 | Ericksen et al. |
| 2012/0312648 A1 | 12/2012 | Yu et al. |
| 2013/0001030 A1 | 1/2013 | Goldasz et al. |
| 2013/0020748 A1 | 1/2013 | Kohlhauser et al. |
| 2013/0037361 A1 | 2/2013 | Park et al. |
| 2013/0081273 A1 | 4/2013 | Mcandrews et al. |
| 2013/0090195 A1 | 4/2013 | Yamaguchi et al. |
| 2013/0119634 A1 | 5/2013 | Camp et al. |
| 2013/0144489 A1 | 6/2013 | Galasso et al. |
| 2013/0168195 A1 | 7/2013 | Park et al. |
| 2013/0220110 A1 | 8/2013 | Zhan et al. |
| 2013/0221713 A1 | 8/2013 | Pelot et al. |
| 2013/0228404 A1 | 9/2013 | Marking |
| 2013/0292218 A1 | 11/2013 | Ericksen et al. |
| 2013/0333993 A1 | 12/2013 | Yu |
| 2014/0000998 A1 | 1/2014 | Bismans et al. |
| 2014/0008160 A1 | 1/2014 | Marking et al. |
| 2014/0027219 A1 | 1/2014 | Marking et al. |
| 2014/0048365 A1 | 2/2014 | Kim |
| 2014/0061419 A1 | 3/2014 | Wehage et al. |
| 2014/0081522 A1 | 3/2014 | Fry |
| 2014/0124313 A1* | 5/2014 | Ericksen ............... F16F 9/465 188/266 |
| 2014/0316652 A1* | 10/2014 | Ericksen ............... F16F 9/512 701/37 |
| 2015/0073656 A1 | 3/2015 | Takamoto et al. |
| 2015/0081171 A1 | 3/2015 | Ericksen et al. |
| 2015/0090547 A1 | 4/2015 | Haugen |
| 2015/0141056 A1 | 5/2015 | Fefilatyev et al. |
| 2015/0175236 A1 | 6/2015 | Walthert et al. |
| 2015/0179062 A1 | 6/2015 | Ralston et al. |
| 2015/0191069 A1 | 7/2015 | Zuleger et al. |
| 2015/0197308 A1 | 7/2015 | Butora et al. |
| 2015/0217829 A1* | 8/2015 | Ericksen ............... B62K 25/08 188/313 |
| 2015/0226283 A1 | 8/2015 | Marking |
| 2015/0233442 A1 | 8/2015 | Noguchi |
| 2015/0276000 A1 | 10/2015 | Kimura et al. |
| 2015/0290993 A1 | 10/2015 | Dillman et al. |
| 2015/0291248 A1 | 10/2015 | Fukao et al. |
| 2016/0003320 A1 | 1/2016 | Kamakura et al. |
| 2016/0025178 A1 | 1/2016 | Kamakura et al. |
| 2016/0031506 A1 | 2/2016 | Lloyd et al. |
| 2016/0076617 A1 | 3/2016 | Marking |
| 2016/0153515 A1 | 6/2016 | Ebersbach et al. |
| 2016/0153516 A1 | 6/2016 | Marking |
| 2016/0185178 A1 | 6/2016 | Galasso et al. |
| 2016/0200163 A1 | 7/2016 | Tsukahara |
| 2016/0200164 A1 | 7/2016 | Tabata et al. |
| 2016/0265615 A1 | 9/2016 | Marking |
| 2016/0290431 A1 | 10/2016 | Marking |
| 2016/0319899 A1 | 11/2016 | Franklin et al. |
| 2016/0355226 A1 | 12/2016 | Pelot et al. |
| 2016/0364989 A1 | 12/2016 | Speasl et al. |
| 2017/0008363 A1 | 1/2017 | Ericksen et al. |
| 2017/0088234 A1 | 3/2017 | Komada et al. |
| 2017/0136843 A1 | 5/2017 | Marking |
| 2017/0184174 A1 | 6/2017 | Marking |
| 2017/0227083 A1 | 8/2017 | Janes |
| 2017/0247072 A1 | 8/2017 | Laird et al. |
| 2017/0259876 A1* | 9/2017 | Ericksen ............... F16F 9/5126 |
| 2017/0268595 A1 | 9/2017 | Inagaki et al. |
| 2017/0282669 A1 | 10/2017 | Cox et al. |
| 2017/0291466 A1 | 10/2017 | Tong |
| 2018/0010666 A1 | 1/2018 | Marking |
| 2018/0031071 A1 | 2/2018 | Marking |
| 2018/0118302 A1 | 5/2018 | Fukao et al. |
| 2018/0150764 A1 | 5/2018 | Stenneth |
| 2018/0156300 A1* | 6/2018 | Sakai ................... B60G 13/08 |
| 2018/0174446 A1 | 6/2018 | Wang |
| 2018/0208011 A1* | 7/2018 | Wigg .................. B60G 17/0152 |
| 2018/0222541 A1 | 8/2018 | Madau et al. |
| 2018/0304149 A1 | 10/2018 | Galasso et al. |
| 2018/0326805 A1 | 11/2018 | Marking |
| 2018/0326808 A1 | 11/2018 | Ericksen et al. |
| 2018/0328442 A1 | 11/2018 | Galasso et al. |
| 2018/0328446 A1 | 11/2018 | Ericksen et al. |
| 2018/0334007 A1 | 11/2018 | Ericksen et al. |
| 2018/0334008 A1 | 11/2018 | Ericksen et al. |
| 2018/0335102 A1 | 11/2018 | Haugen |
| 2018/0339565 A1 | 11/2018 | Ericksen et al. |
| 2018/0339566 A1 | 11/2018 | Ericksen et al. |
| 2018/0339567 A1 | 11/2018 | Ericksen et al. |
| 2018/0355943 A1 | 12/2018 | Cox |
| 2018/0355946 A1* | 12/2018 | Ericksen ............... F16F 9/5126 |
| 2019/0030975 A1 | 1/2019 | Galasso et al. |
| 2019/0031264 A1 | 1/2019 | Laird et al. |
| 2019/0032745 A1 | 1/2019 | Marking |
| 2019/0092116 A1 | 3/2019 | Magnus et al. |
| 2019/0118898 A1* | 4/2019 | Ericksen ............... F16F 9/465 |
| 2019/0154100 A1 | 5/2019 | Coaplen et al. |
| 2019/0176557 A1 | 6/2019 | Marking et al. |
| 2019/0184782 A1 | 6/2019 | Shaw et al. |
| 2019/0203798 A1 | 7/2019 | Cox et al. |
| 2019/0226545 A1 | 7/2019 | Schmidt et al. |
| 2019/0247744 A1 | 8/2019 | Galasso et al. |
| 2019/0249769 A1 | 8/2019 | Hamed |
| 2019/0263474 A1 | 8/2019 | Hamed |
| 2019/0301598 A1 | 10/2019 | Sonenthal |
| 2020/0191227 A1 | 6/2020 | Laird |
| 2020/0292025 A1* | 9/2020 | Ericksen .......... B60G 17/01908 |
| 2020/0354013 A1* | 11/2020 | Ericksen ................ B62K 25/08 |
| 2021/0139102 A1 | 5/2021 | Komada et al. |
| 2022/0242186 A1* | 8/2022 | Tong ...................... F16F 9/516 |
| 2022/0252129 A1 | 8/2022 | Haugen |
| 2023/0002002 A1* | 1/2023 | Ericksen ................ B60G 17/08 |
| 2023/0019929 A1 | 1/2023 | Cox et al. |

FOREIGN PATENT DOCUMENTS

| | | |
|---|---|---|
| DE | 1555311 A1 | 8/1970 |
| DE | 3241901 A1 | 5/1984 |
| DE | 3613386 A1 | 10/1986 |
| DE | 3532292 A1 | 3/1987 |
| DE | 3536655 A1 | 4/1987 |
| DE | 3709447 A1 | 10/1988 |
| DE | 3711442 A1 | 10/1988 |
| DE | 3738048 A1 | 5/1989 |
| DE | 3924166 C1 | 2/1991 |
| DE | 4022099 C1 | 12/1991 |
| DE | 4029090 A1 | 3/1992 |
| DE | 4406918 A1 | 9/1994 |

(56) References Cited

FOREIGN PATENT DOCUMENTS

| | | |
|---|---|---|
| DE | 19757276 A1 | 6/1999 |
| DE | 202004005229 U1 | 8/2004 |
| DE | 10326675 A1 | 12/2004 |
| DE | 102005025811 A1 | 12/2006 |
| DE | 102007056313 A1 | 5/2009 |
| DE | 102007063365 A1 | 7/2009 |
| DE | 202008015968 U1 | 4/2010 |
| DE | 202010012738 U1 | 12/2010 |
| EP | 207409 A2 | 1/1987 |
| EP | 304801 A2 | 3/1989 |
| EP | 0306819 A2 | 3/1989 |
| EP | 0403803 A1 | 12/1990 |
| EP | 552568 A1 | 7/1993 |
| EP | 0556925 A2 | 8/1993 |
| EP | 0735280 A2 | 10/1996 |
| EP | 0806587 A1 | 11/1997 |
| EP | 1050696 A2 | 11/2000 |
| EP | 1138530 A2 | 10/2001 |
| EP | 1188661 A2 | 3/2002 |
| EP | 1241087 A1 | 9/2002 |
| EP | 1355209 A1 | 10/2003 |
| EP | 1394439 A1 | 3/2004 |
| EP | 1449688 A2 | 8/2004 |
| EP | 1623856 A2 | 2/2006 |
| EP | 1662167 A1 | 5/2006 |
| EP | 1757473 A2 | 2/2007 |
| EP | 1825220 A2 | 8/2007 |
| EP | 2103512 A2 | 9/2009 |
| EP | 2116739 A2 | 11/2009 |
| EP | 2189191 A2 | 5/2010 |
| EP | 2248691 A1 | 11/2010 |
| EP | 2357098 A2 | 8/2011 |
| EP | 2410203 A2 | 1/2012 |
| EP | 2479095 A2 | 7/2012 |
| EP | 2495472 A2 | 9/2012 |
| EP | 2357098 B1 | 10/2014 |
| EP | 2848582 A1 | 3/2015 |
| EP | 2567839 B1 | 3/2019 |
| EP | 3786049 A1 | 3/2021 |
| EP | 3786049 B1 | 5/2023 |
| EP | 4257469 A3 | 8/2024 |
| FR | 1343760 A | 11/1963 |
| FR | 2432424 A1 | 2/1980 |
| FR | 2449236 A1 | 9/1980 |
| FR | 2529002 A2 | 12/1983 |
| FR | 2617928 A1 | 1/1989 |
| FR | 2952031 A1 | 5/2011 |
| GB | 806307 A | 12/1958 |
| GB | 1185074 A | 3/1970 |
| GB | 2104183 A | 3/1983 |
| GB | 2159234 A | 11/1985 |
| GB | 2159604 A | 12/1985 |
| GB | 2180320 A | 3/1987 |
| GB | 2190461 A | 11/1987 |
| GB | 2282864 A | 4/1995 |
| GB | 2289111 A | 11/1995 |
| GB | 2347479 A | 9/2000 |
| JP | 57173632 A | 10/1982 |
| JP | 57173632 U | 11/1982 |
| JP | 57182506 A | 11/1982 |
| JP | S58172142 A | 10/1983 |
| JP | 01106721 A | 4/1989 |
| JP | H0193637 A | 4/1989 |
| JP | H02168038 A | 6/1990 |
| JP | H03113139 A | 5/1991 |
| JP | 04203540 A | 7/1992 |
| JP | 05149364 A | 6/1993 |
| JP | H05319054 A | 12/1993 |
| JP | 06101735 A | 4/1994 |
| JP | 06185562 A | 7/1994 |
| JP | H084818 A | 1/1996 |
| JP | H1073141 A | 3/1998 |
| JP | 2005119548 A | 5/2005 |
| JP | 2005119549 A | 5/2005 |
| JP | 2007302211 A | 11/2007 |
| JP | 2008094124 A | 4/2008 |
| JP | 2008238921 A | 10/2008 |
| KR | 19980043226 U | 9/1998 |
| KR | 20070076226 A | 7/2007 |
| KR | 20100041679 A | 4/2010 |
| RU | 2469224 C1 | 12/2012 |
| WO | 9840231 A2 | 9/1998 |
| WO | 99/06231 | 2/1999 |
| WO | 0027658 A1 | 5/2000 |
| WO | 03070546 A1 | 8/2003 |
| WO | 03102426 A2 | 12/2003 |
| WO | 2006065235 A2 | 6/2006 |
| WO | 2007017739 A2 | 2/2007 |
| WO | 2007117884 A2 | 10/2007 |
| WO | 2008086605 A1 | 7/2008 |
| WO | 2008114445 A1 | 9/2008 |
| WO | 2013066159 A1 | 5/2013 |
| WO | 2021066819 A1 | 4/2021 |

OTHER PUBLICATIONS

European Search Report, European Patent Application No. 14189773.6, May 4, 2015, 4 Pages.
"Communication Re Oral Proceedings for European U.S. Appl. No. 10/161,906, dated Feb. 15, 2013 (Feb. 15, 2013)".
"European Patent Office Final Decision dated Mar. 21, 2013", European Patent Application No. 10161906.2.
"European Search Report for European U.S. Appl. No. 09/177,128, 4 pages, Aug. 25, 2010 (Aug. 25, 2010)".
"European Search Report for European U.S. Appl. No. 10/161,906 , 3 pages, Sep. 15, 2010 (Sep. 15, 2010)".
"European Search Report for European U.S. Appl. No. 11/153,607, 3 pages, Aug. 10, 2012 (Aug. 10, 2012))".
"European Search Report for European U.S. Appl. No. 11/172,612 , 2 pages, Oct. 6, 2011 (Oct. 6, 2011))".
"European Search Report for European U.S. Appl. No. 13/158,034 , 4 pages, Jun. 28, 2013 (Jun. 28, 2013))".
"European Search Report for European U.S. Appl. No. 13/189,574, 2 pages, Feb. 19, 2014 (Feb. 19, 2014)".
"European Search Report for European U.S. Appl. No. 15/167,426 , 4 pages, Sep. 18, 2015 (Sep. 18, 2015))".
"European Search Report for European U.S. Appl. No. 16/167,306 , 2 pages, Mar. 23, 2017 (Mar. 23, 2017)".
"European Search Report and Written Opinion, European Patent Application No. 13165362.8", Sep. 24, 2014, 6 Pages.
"Office Action for European Application No. 13158034.2, 5 pages, Mailed May 22, 2014".
"The Lee Company Technical Hydraulic Handbook", 1996, 1-696.
Shiozaki, et al., "SP-861-Vehicle Dynamics and Electronic Controlled Suspensions SAE Technical Paper Series No. 910661", International Congress and Exposition, Detroit, Mich., Feb. 25-Mar. 1, 1991.
English language abstract for EP 0207409 (no date).
European Examination Report for EP Application No. 11188520.8, 9 pages, Mailed Jul. 19, 2022.
European Examination Report for European Application No. 11275170.6, 6 pages, Oct. 20, 2022.
European Extended Search Report for European Application No. 23166846.8, 24 Pages, Mailed Jul. 25, 2024.
European Search Report for European Application No. 19193903.2, 6 pages, Oct. 19, 2021 (Oct. 19, 2021).
European Search Report for European U.S. Appl. No. 19/155,995 , 11 pages, Aug. 28, 2019.
European Search Report for European Application No. 19157965.5, 7 pages, Mar. 24, 2020 (Mar. 24, 2020).
European Search Report for European Application No. 19206334.5, 6 pages, May 12, 2020 (May 12, 2020).
European Search Report for European Application No. 19212356.0, 8 pages, May 7, 2020 (May 7, 2020).
European Search Report for European Application No. 20154392.3, 7 pages, Jul. 2, 2020 (Jul. 2, 2020).
European Search Report for European Application No. 20206708.8 , 11 pages, May 17, 2021.

(56) References Cited

OTHER PUBLICATIONS

Haller, E, Epo machine translation of CN 101468587 (A) Device with a suspension system and method for setting a suspension system, published on Jul. 1, 2009.
Machine translation DE3613386; Oct. 1986.
Machine translation EP 0403803; Dec. 1990.
Machine translation KR20100041679; Apr. 2010.
European Search Report for European U.S. Appl. No. 19/157,767, filed Oct. 16, 2019, 9 Pages.
European Search Report for European Application No. 21170685.8, Nov. 10, 2021, 8 Pages.
EP Search Report for European Application No. 21173940.4, Nov. 12, 2021, 9 Pages.
European Search Report for European U.S. Appl. No. 20/187,747, filed Nov. 18, 2020, 11 Pages.
Fachkunde Fahrradtechnik 4 Auflage, Gressmann_Inhaltv und S, 2011, 206-207.
Statement of Grounds of Appeal, EP App. No. 11153607.4, May 28, 2018, 88 Pages.
Grounds of Appeal, EP App. No. 11153607.4, Jun. 1, 2018, 28 Pages.
EP Search Report for European Application No. 15163428.4, Jul. 3, 2017, 7 Pages.
"17 Years of Innovation and Still Evolving", https://www.powertap.com/post/blog-15-17-years-of-innovation-and-still-evolving, Nov. 28, 2018, 8 Pages.
"ANT Message Protocol and Usage", Dynastream Innovations, Inc., Jul. 2, 2007, 68 Pages.
"Basis For Claims Filed 23.01.15", European Patent Application No. 14189773.6, 2 Pages.
"European Search Report for European No. 09159949, 2 pages, Sep. 11, 2017 (Sep. 11, 2017)".
"European Search Report for European No. 10187320, 12 pages, Sep. 25, 2017 (Sep. 25, 2017)".
"European Search Report for European No. 11172553, 2 pages, Sep. 25, 2017 (Sep. 25, 2017)".
"European Search Report for European No. 11175126, 2 pages, Sep. 25, 2017 (Sep. 25, 2017)".
"European Search Report for European No. 11275170, 2 pages, Jan. 10, 2018 (Jan. 10, 2018)".
"European Search Report for European No. 12170370, 2 pages, Nov. 15, 2017 (Nov. 15, 2017)".
"European Search Report for European No. 12184150, 10 pages, Dec. 12, 2017 (Dec. 12, 2017)".
"European Search Report for European Application No. 13174817.0, 13 pages, Jan. 8, 2018 (Jan. 8, 2018))".
"European Search Report for European No. 17154191, 2 pages, Jun. 28, 2017 (Jun. 28, 2017)".
"European Search Report for European No. 17188022, 9 pages, Feb. 1, 2018 (Feb. 1, 2018))".
"European Search Report for EP Application No. 18154672, 3 pages, Mailed Aug. 28, 2018 (Aug. 28, 2018))".
"Notice of Intent to Grant EP Application 09159949.8 mailed Nov. 14, 2019, p. 48".
Healey, "The Tyre as Part of the Suspension System", The Institution of Automobile Engineers, Nov. 1924, 26-128.
Kasprzak, "Understanding Your Dampers: A guide from Jim Kasprzak", http://www.kaztechnologies.com/downloads/kaz-tech-tips/ Accessed: Oct. 24, 2018, 25 pages.
Kensuke, Suspension Control Device, machine translation of JPH05319054 (A), 1993-12-03 (Year: 1993).
Litchfield, "Pneumatic Tires", Transactions (Society of Automobile Engineers), vol. 8, Part II, 1913, 208-223.
Nilsson, "Opposition Letter Against EP-2357098", Oct. 13, 2017, 7.
Puhn, "How To Make Your Car Handle", HPBooks, 1981, 7 Pages.
Smith, ""The Bump Stop" in Engineer to win—Chapter 13: Springs and Shock Absorbers", MBI Publishing Company and Motorbooks, USA XP055430818, ISBN: 978-0-87938-186-8, Dec. 31, 1984, 207.
Thum, Notice of Opposition to a European Patent, EP App. No. 14189773.6, Dec. 13, 2018, 49 Pages.
Thum, "Oppostion Letter Against EP2357098", Oct. 16, 2018, 39.
Thum, "Oppostion Letter Against EP2357098", Dec. 17, 2019, 25 Pages.
Waechter, et al., "A Multibody Model for the Simulation of Bicycle Suspension Systems", Vehicle System Dynamics, vol. 37, No. 1, 2002, 3-28.
Weickert, Response to the Communication of the Board of Appeal, Opposition Against European Patent, EP App. No. 14189773.6, 13 Pages, Dated Aug. 29, 2024.
JP2008094124A—english translation by Clarivate (Year: 2008).

\* cited by examiner

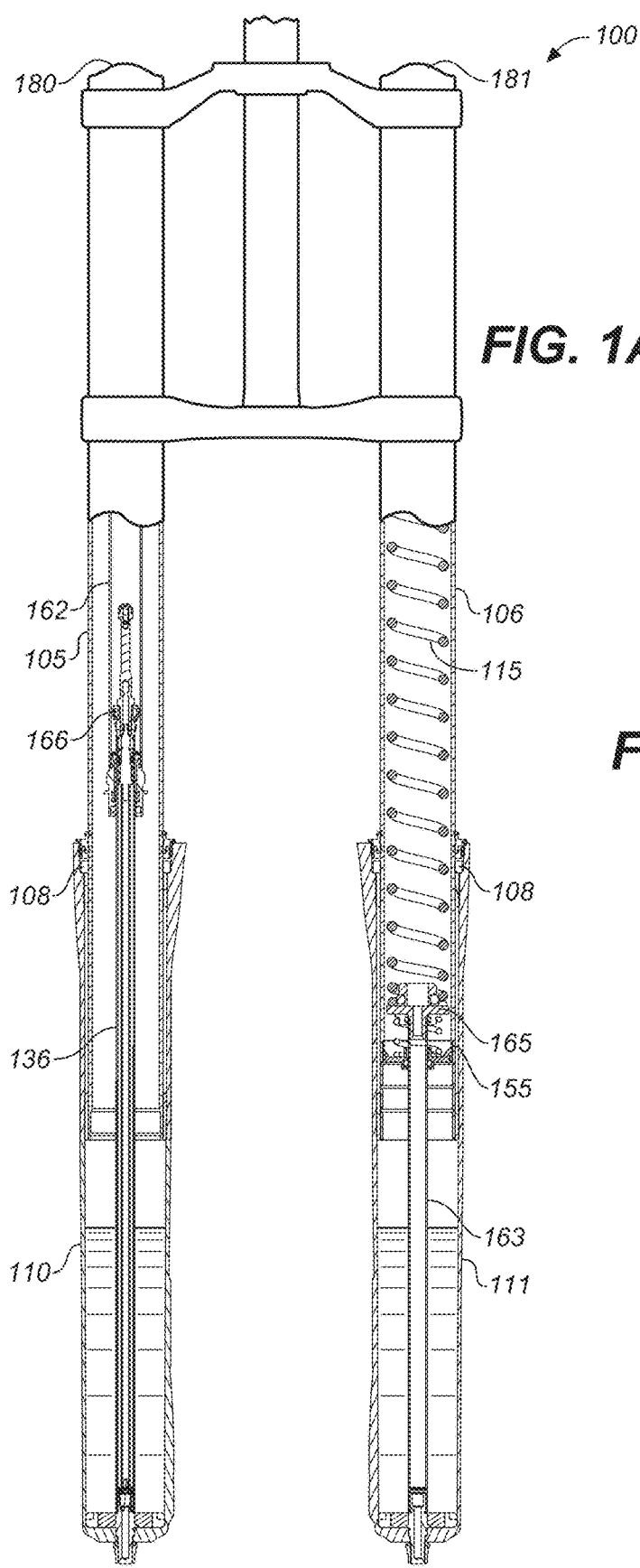
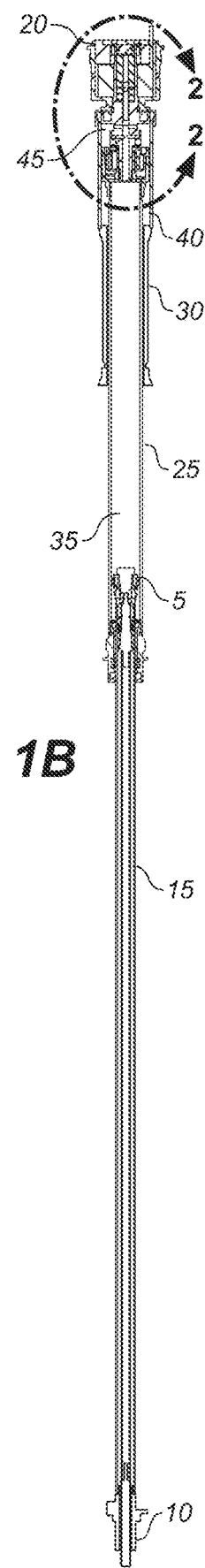
FIG. 1A
FIG. 1B

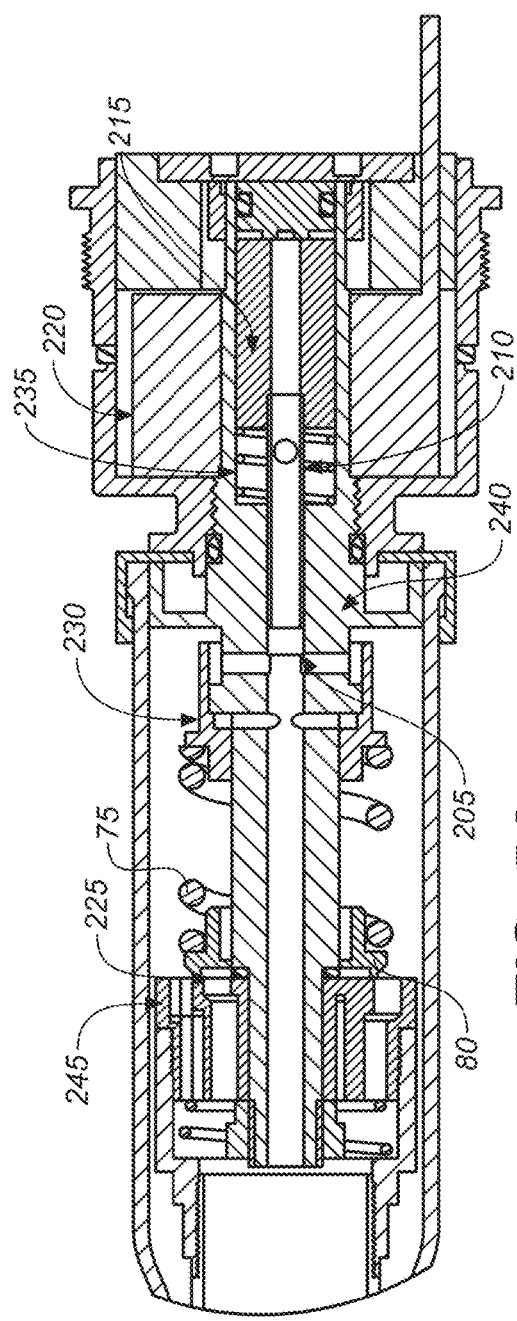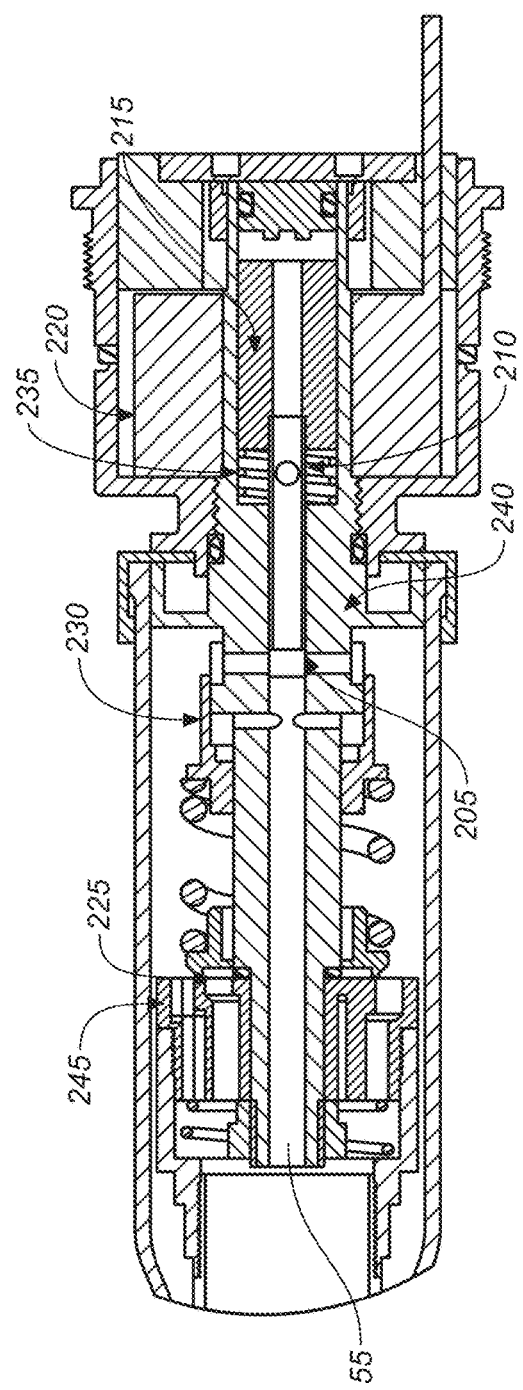
FIG. 5A
FIG. 5B

METHOD AND APPARATUS FOR AN ADJUSTABLE DAMPER

CROSS-REFERENCE TO RELATED APPLICATIONS

This application is a continuation application of and claims the benefit of co-pending U.S. patent application Ser. No. 17/716,919 filed on Apr. 8, 2022, entitled "METHOD AND APPARATUS FOR AN ADJUSTABLE DAMPER", and assigned to the assignee of the present application, and is hereby incorporated by reference in its entirety herein.

The U.S. patent application Ser. No. 17/716,919 application is a continuation application of and claims the benefit of U.S. patent application Ser. No. 16/838,484 filed on Jul. 24, 2020, now U.S. Issued U.S. Pat. No. 11,299,233, entitled "METHOD AND APPARATUS FOR AN ADJUSTABLE DAMPER", and assigned to the assignee of the present application, and is hereby incorporated by reference in its entirety herein.

The U.S. patent application Ser. No. 16/938,484 is a continuation application of and claims the benefit of U.S. patent application Ser. No. 16/224,516 filed on Dec. 18, 2018, now U.S. Pat. No. 10,723,409, entitled "METHOD AND APPARATUS FOR AN ADJUSTABLE DAMPER", and assigned to the assignee of the present application, and is hereby incorporated by reference in its entirety herein.

The U.S. patent application Ser. No. 16/224,516 is a continuation application of and claims the benefit of U.S. patent application Ser. No. 15/599,469 filed on May 19, 2017, now U.S. Pat. No. 10,160,511, entitled "METHOD AND APPARATUS FOR AN ADJUSTABLE DAMPER", and assigned to the assignee of the present application, and is hereby incorporated by reference in its entirety herein.

The U.S. patent application Ser. No. 15/599,469 is a continuation application of and claims the benefit of U.S. patent application Ser. No. 14/690,267 filed on Apr. 17, 2015, now U.S. Pat. No. 9,663,181, entitled "METHOD AND APPARATUS FOR AN ADJUSTABLE DAMPER", and assigned to the assignee of the present application, and is hereby incorporated by reference in its entirety herein.

The U.S. patent application Ser. No. 13/843,704 is a divisional application of and claims the benefit of U.S. patent application Ser. No. 13/843,704 filed on Mar. 15, 2013, now U.S. Pat. No. 9,033,122, entitled "METHOD AND APPARATUS FOR AN ADJUSTABLE DAMPER", and assigned to the assignee of the present application, and is hereby incorporated by reference in its entirety herein.

The U.S. patent application Ser. No. 13/843,704 claims the benefit of and claims priority of U.S. provisional patent application Ser. No. 61/709,041, filed on Oct. 2, 2012, entitled "METHOD AND APPARATUS FOR AN ADJUSTABLE DAMPER" by Ericksen et al., assigned to the assignee of the present application, and is hereby incorporated by reference in its entirety herein.

The U.S. patent application Ser. No. 13/843,704 claims the benefit of and claims priority of U.S. provisional patent application Ser. No. 61/667,327, filed on Jul. 2, 2012, entitled "METHOD AND APPARATUS FOR AN ADJUSTABLE DAMPER" by Ericksen et al., assigned to the assignee of the present application, and is hereby incorporated by reference in its entirety herein.

The U.S. patent application Ser. No. 13/843,704 is a continuation-in-part application of and claims the benefit of U.S. patent application Ser. No. 13/485,401, filed on May 31, 2012, now abandoned, entitled "METHOD AND APPARATUS FOR POSITION SENSITIVE SUSPENSION" by Ericksen et al., assigned to the assignee of the present application, now abandoned, and is hereby incorporated by reference in its entirety herein.

The application with Ser. No. 13/485,401 claims the benefit of and claims priority of U.S. provisional patent application Ser. No. 61/491,858, filed on May 31, 2011, entitled "METHOD AND APPARATUS FOR POSITION SENSITVE SUSPENSION DAMPENING" by Ericksen et al., assigned to the assignee of the present application, and is hereby incorporated by reference in its entirety herein.

The application with Ser. No. 13/485,401 claims the benefit of and claims priority of U.S. provisional patent application Ser. No. 61/645,465, filed on May 10, 2012, entitled "METHOD AND APPARATUS FOR AN ADJUSTABLE DAMPER" by Cox et al., assigned to the assignee of the present application, and is hereby incorporated by reference in its entirety herein.

The U.S. patent application Ser. No. 13/843,704 is a continuation-in-part application of and claims the benefit of U.S. patent application Ser. No. 12/684,072, filed on Jan. 7, 2010, now abandoned, entitled "REMOTELY OPERATED BYPASS FOR A SUSPENSION DAMPER" by John Marking, now abandoned, assigned to the assignee of the present application, and is hereby incorporated by reference in its entirety herein.

The application with Ser. No. 12/684,072 claims the benefit of and claims priority of U.S. provisional patent application Ser. No. 61/143,152, filed on Jan. 7, 2009, entitled "REMOTE BYPASS LOCK-OUT" by John Marking, assigned to the assignee of the present application, and is hereby incorporated by reference in its entirety herein.

The U.S. patent application Ser. No. 13/843,704 is a continuation-in-part application of and claims the benefit of U.S. patent application Ser. No. 13/189,216, filed on Jul. 22, 2011, entitled "SUSPENSION DAMPER WITH REMOTELY-OPERABLE VALVE" by John Marking, now U.S. Pat. No. 9,239,090, assigned to the assignee of the present application, and is hereby incorporated by reference in its entirety herein.

The application with Ser. No. 13/189,216 is a continuation-in-part application of and claims the benefit of U.S. patent application Ser. No. 13/010,697, filed on Jan. 20, 2011, entitled "REMOTELY OPERATED BYPASS FOR A SUSPENSION DAMPER" by John Marking, now U.S. Pat. No. 8,857,580, assigned to the assignee of the present application, and is hereby incorporated by reference in its entirety herein.

The application with Ser. No. 13/010,697 claims the benefit of and claims priority of U.S. provisional patent application Ser. No. 61/296,826, filed on Jan. 20, 2010, entitled "BYPASS LOCK-OUT VALVE FOR A SUSPENSION DAMPER" by John Marking, assigned to the assignee of the present application, and is hereby incorporated by reference in its entirety herein.

The application with Ser. No. 13/189,216 is a continuation-in-part application of and claims the benefit of U.S. patent application Ser. No. 13/175,244, filed on Jul. 1, 2011, entitled "BYPASS FOR A SUSPENSION DAMPER" by John Marking, now U.S. Pat. No. 8,627,932, assigned to the assignee of the present application, and is hereby incorporated by reference in its entirety herein.

The application with Ser. No. 13/175,244 claims the benefit of and claims priority of U.S. provisional patent application Ser. No. 61/361,127, filed on Jul. 2, 2010, entitled "BYPASS LOCK-OUT VALVE FOR A SUSPENSION DAMPER" by John Marking, assigned to the assignee of the present application, and is hereby incorporated by reference in its entirety herein.

BACKGROUND

Field of the Invention

Embodiments generally relate to a damper assembly for a vehicle. More specifically, the invention relates to an adjustable damper for use with a vehicle suspension.

Description of the Related Art

Vehicle suspension systems typically include a spring component or components and a dampening component or components. Typically, mechanical springs, like helical springs are used with some type of viscous fluid-based dampening mechanism and the two are mounted functionally in parallel. In some instances, a spring may comprise pressurized gas and features of the damper or spring are user-adjustable, such as by adjusting the air pressure in a gas spring. A damper may be constructed by placing a damping piston in a fluid-filled cylinder (e.g., liquid such as oil). As the damping piston is moved in the cylinder, fluid is compressed and passes from one side of the piston to the other side. Often, the piston includes vents there-through which may be covered by shim stacks to provide for different operational characteristics in compression or extension.

Conventional damping components provide a constant damping rate during compression or extension through the entire length of the stroke. Other conventional damping components provide mechanisms for varying the damping rate. As various types of recreational and sporting vehicles continue to become more technologically advanced, what is needed in the art are improved techniques for varying the damping rate.

BRIEF DESCRIPTION OF THE DRAWINGS

FIG. 1A depicts an asymmetric bicycle fork having a damping leg and a spring leg.

FIG. 1B depicts a cross-sectional side elevation view of a shock absorber of a bicycle fork cartridge, in accordance with an embodiment.

FIG. 5A and FIG. 5B depict a cross-sectional side elevation view of a valve assembly of detail 2 of the shock absorber of FIG. 1B, in accordance with an embodiment.

Figure 2:
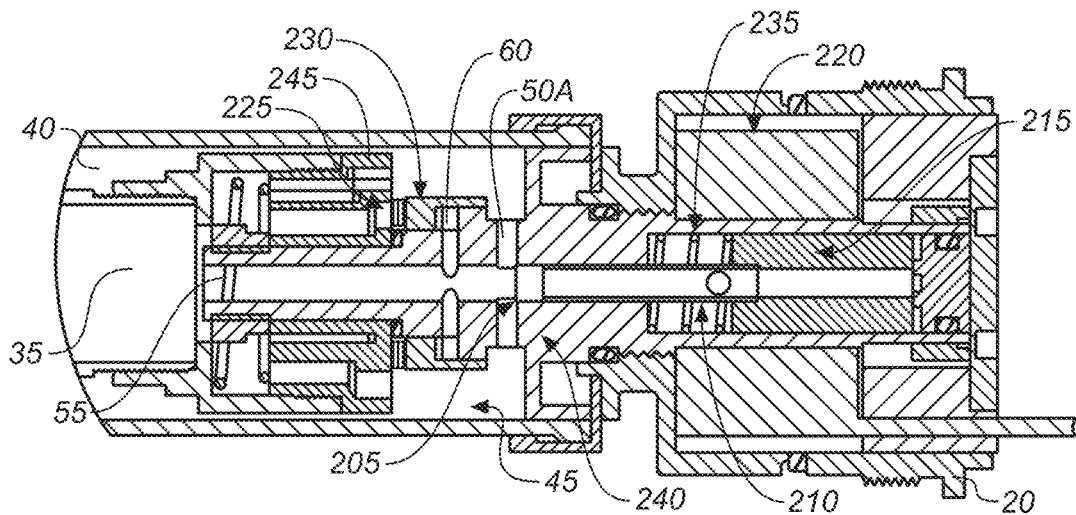
FIG. 2, FIG. 3, and FIG. 4 depict a cross-sectional side elevation view of various operational positions of an embodiment of the base valve assembly of detail 2 of FIG. 1B.

The drawings referred to in this description should be understood as not being drawn to scale except if specifically noted.

BRIEF DESCRIPTION

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is applicable to alternative embodiments, modifications and equivalents, which may be included within the spirit and scope of the invention as defined by the appended claims.

Furthermore, in the following description of embodiments, numerous specific details are set forth in order to provide a thorough understanding of the present technology. However, the present technology may be practiced without these specific details. In other instances, well known methods, procedures, and components have not been described in detail as not to unnecessarily obscure aspects of the present disclosure.

Embodiments describe a system and method for a pilot spool valve assembly that enables the generation of relatively large damping forces by a relatively small solenoid (or other motive source), while using relatively low amounts of power. Furthermore, since the incompressible fluid inside of the valve body of the shock absorber assembly causes damping to occur as the valve opens and the valve body collapses, embodiments enable both a controllable preload on the valve stack and a controllable damping rate.

In one embodiment, the solenoid includes a "latching" mechanism to open and close the pressure-balanced pilot spool. Due to the latching configuration of the solenoid, power is only required to open or close the valve. Power is not required to hold the valve open or closed in either setting. Consequently, embodiments enable reduced power consumption compared to the traditional shock absorber.

Further embodiments provide an externally-adjustable means of tuning the open state of the damper. An adjuster turns in or out to vary the effective orifice size of the pilot spool when in the open position. This allows the rider to adjust the soft setting of the damper to his preference.

The following discussion describes the FIGS. 1-8B and embodiments shown therein.

Integrated damper/spring vehicle shock absorbers often include a damper body surrounded by or used in conjunction with a mechanical spring or constructed in conjunction with an air spring or both. The damper often consists of a piston and shaft telescopically mounted in a fluid filled cylinder. The damping fluid (i.e., damping liquid) or damping liquid may be, for example, hydraulic oil. A mechanical spring may be a helically wound spring that surrounds or is mounted in parallel with the damper body. Vehicle suspension systems typically include one or more dampers as well as one or more springs mounted to one or more vehicle axles. As used herein, the terms "down", "up", "downward", "upward", "lower", "upper", and other directional references are relative and are used for reference only.

FIG. 1A shows an asymmetric bicycle fork 100 having a damping leg and a spring leg. The damping leg includes an upper tube 105 mounted in telescopic engagement with a lower tube 110 and having fluid damping components therein. The spring leg includes an upper tube 106 mounted in telescopic engagement with a lower tube 111 and having spring components therein. The upper legs 105, 106 may be held centralized within the lower legs 110, 111 by an annular bushing 108. The fork 100 may be included as a component of a bicycle such as a mountain bicycle or an off-road vehicle such as an off-road motorcycle. In some embodiments, the fork 100 may be an "upside down" or Motocross-style motorcycle fork.

In one embodiment, the damping components inside the damping leg include an internal piston 166 disposed at an upper end of a damper shaft 136 and fixed relative thereto. The internal piston 166 is mounted in telescopic engagement with a cartridge tube 162 connected to a top cap 180 fixed at one end of the upper tube 105. The interior volume of the damping leg may be filled with a damping liquid such as hydraulic oil. The piston 166 may include shim stacks (i.e., valve members) that allow a damping liquid to flow through vented paths in the piston 166 when the upper tube 105 is moved relative to the lower tube 110. A compression chamber is formed on one side of the piston 166 and a rebound chamber is formed on the other side of the piston 166. The pressure built up in either the compression chamber or the rebound chamber during a compression stroke or a rebound stroke provides a damping force that opposes the motion of the fork 100.

The spring components inside the spring leg include a helically wound spring 115 contained within the upper tube 106 and axially restrained between top cap 181 and a flange 165. The flange 165 is disposed at an upper end of the riser tube 163 and fixed thereto. The lower end of the riser tube 163 is connected to the lower tube 111 in the spring leg and fixed relative thereto. A valve plate 155 is positioned within the upper leg tube 106 and axially fixed thereto such that the plate 155 moves with the upper tube 106. The valve plate 155 is annular in configuration, surrounds an exterior surface of the riser tube 163, and is axially moveable in relation thereto. The valve plate 155 is sealed against an interior surface of the upper tube 106 and an exterior surface of the riser tube 163. A substantially incompressible lubricant (e.g., oil) may be contained within a portion of the lower tube 111 filling a portion of the volume within the lower tube 111 below the valve plate 155. The remainder of the volume in the lower tube 111 may be filled with gas at atmospheric pressure.

During compression of fork 100, the gas in the interior volume of the lower tube 111 is compressed between the valve plate 155 and the upper surface of the lubricant as the upper tube 106 telescopically extends into the lower tube 111. The helically wound spring 115 is compressed between the top cap 181 and the flange 165, fixed relative to the lower tube 111. The volume of the gas in the lower tube 111 decreases in a nonlinear fashion as the valve plate 155, fixed relative to the upper tube 106, moves into the lower tube 111. As the volume of the gas gets small, a rapid build-up in pressure occurs that opposes further travel of the fork 100. The high pressure gas greatly augments the spring force of spring 115 proximate to the "bottom-out" position where the fork 100 is fully compressed. The level of the incompressible lubricant may be set to a point in the lower tube 111 such that the distance between the valve plate 155 and the level of the oil is substantially equal to a maximum desired travel of the fork 100.

Referring now to FIG. 1B, a cross-sectional side elevation view of a shock absorber of a bicycle fork cartridge is depicted, in accordance with an embodiment. More particularly, FIG. 1B shows the inner portions of the bicycle fork leg assembly, comprising a damper piston 5. In practice, the top cap 20 is affixed to an upper tube (not shown) and the lower connector 10 is fixed to a lower leg tube (not shown) where the upper tube is typically telescopically mounted within the lower tube (although the reverse may also be the case). As the upper tube and the lower tube telescope in contraction or expansion in response to disparities in the terrain being traversed by a vehicle, including such for shock absorbsion, so also the damper piston 5 and piston rod 15 move telescopically into and out of damper cylinder 25. During compression, the volume of the piston rod 15 displaces, from the cylinder 25, a volume of damping liquid contained within the cylinder 25 corresponding to the volume of the piston rod 15 incurring into the damper cylinder 25. During extension or "rebound", the volume of liquid must be replaced as the piston rod 15 leaves the interior of the damper cylinder 25.

Damping liquid displaced as described above moves from the damper cylinder 25, through a base valve assembly of detail 2 and ultimately into an elastic bladder 30 during compression, and from the elastic bladder 30, back through the base valve assembly of detail 2 and into the damper cylinder 25 during rebound. In one embodiment, the base valve assembly of detail 2 allows for the compression damping to be adjusted by the user.

Figure 3:
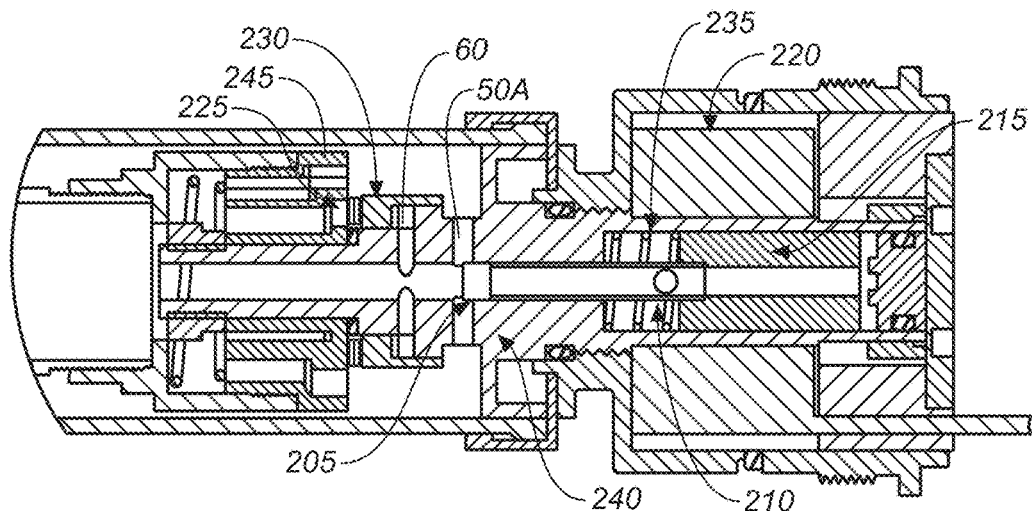
Figure 4:
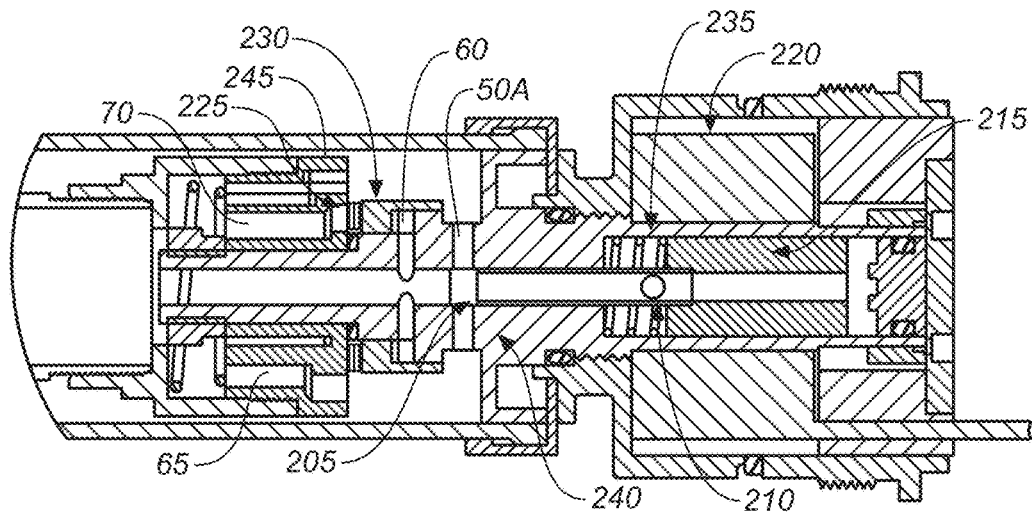

FIG. 2, FIG. 3, and FIG. 4 show cross-sectional side elevation views of various operational positions of an embodiment of the base valve assembly of detail 2 of FIG. 1B. FIGS. 2-4 show a continuously variable semi active arrangement, in accordance with embodiments, and as will be described in more detail below. In brief, a solenoid balanced by an armature biasing spring 235 axially locates a pressure-balanced pilot spool 210. The pressure-balanced pilot spool 210 controls the pressure inside the valve body 230. As this pressure is increased inside the valve body 230, the axially force of the valve body 230 on the conventional valve shim increases. Due to the pilot spool assembly arrangement, a relatively small solenoid (using relatively low amounts of power) can generate relatively large damping forces. Furthermore, due to incompressible fluid inside the valve body 230, damping occurs as the valve opens and the valve body 230 collapses. The result is not only a controllable preload on the valve stack, but also a controllable damping rate. Embodiments discussed herein may optionally be packaged in a base valve, the compression adjuster of a shock absorber, and/or on the main piston of a shock absorber.

FIG. 2 is a detailed view of the base valve assembly of detail 2 of FIG. 1B, with the valve shown in the retracted soft position. This retracted position corresponds to minimum or no current in the solenoid. In FIG. 2, a first damping fluid flow path between damping cylinder interior 35 and annular reservoir 40 (including bladder 30 interior; see FIG. 1B) is substantially unobstructed via bleed passage 55, ports 50A and upper annulus 45. (Also shown in FIG. 2 is the main piston 245.)

FIG. 3 is a detailed view of the base valve assembly of detail 2 of FIG. 1B, with the valve shown in the mid-damping position. This corresponds to medium current supplied to the solenoid. FIG. 3 shows a partial obstruction of ports 50A by metering edge 205 of the pilot spool 210.

FIG. 4 is a detailed view of the base valve assembly of detail 2 of FIG. 1B, with the valve shown in the firm-damping position. FIG. 4 shows substantial blockage of ports 50A by the metering edge 205 of the pilot spool 210, which is axially displaced relative to its position in FIG. 2.

Of note, the pilot spool 210 shown in FIG. 2 is in a retracted soft position, in which the metering edge 205 of the pilot spool 210 is not obstructing the ports 50A. However, the pilot spool 210 shown in FIG. 3 is in a middle position, in which the metering edge 205 of the pilot spool 210 is partially obstructing the ports 50A. The pilot spool 210 shown in FIG. 4 is in a firm position, in which the metering edge 205 of the pilot spool 210 is fully obstructing ports 50A.

In one embodiment, the axial displacement of the pilot spool 210 is facilitated by an electromagnetic interaction between the armature 215 and the coil 220. Adjustment of the current in the coil 220 (via modulation of the current from a power source [not shown]) to predetermined values causes the armature 215, and hence the pilot spool 210, to move in corresponding predetermined axial positions relative to the coil 220. As such, the pilot spool 210 can be adjusted as shown in the FIGS. 2-4.

When the pilot spool 210 is closing ports 50A, as shown in FIG. 4, substantially all damping fluid compression flow must flow through port 70 and valve shims 225. In addition, the damping fluid pressure acting through and in annulus 60 on an interior of the valve body 230 is increased and therefore the valve body 230 exerts more closing force of the valve shims 225. The net result is an increased compression damping due to closure of ports 50A and a further compression damping increase due to a corresponding pressure increase in the compression damping within annulus 60. When the pilot spool 210 is located in a middle position as is shown in FIG. 3, the foregoing results apply in a diminished way because some of the compression flow (albeit less than full compression flow) may flow through partially open ports 50A. The embodiment of FIG. 2 also exhibits some effect of pressure boosting via annulus 60 on the valve body 230, but the phenomenon occurs at higher compression rates.

FIG. 5A and FIG. 5B depict a cross-sectional side elevation view of a valve assembly of detail 2 of the shock absorber of FIG. 1B, in accordance with an embodiment. FIG. 5A and FIG. 5B show an embodiment in which the valve body 230 acts on the valve shims 225 through a spring 75. In use, the valve body 230 increases or decreases the preload on the spring 75. FIG. 5A shows the pilot spool 210 in the retracted soft position, thereby causing the preload on the spring 75 to decrease. FIG. 5B shows the pilot spool 210 in the firm position, thereby causing the preload on the spring 75 to increase.

Figure 6:
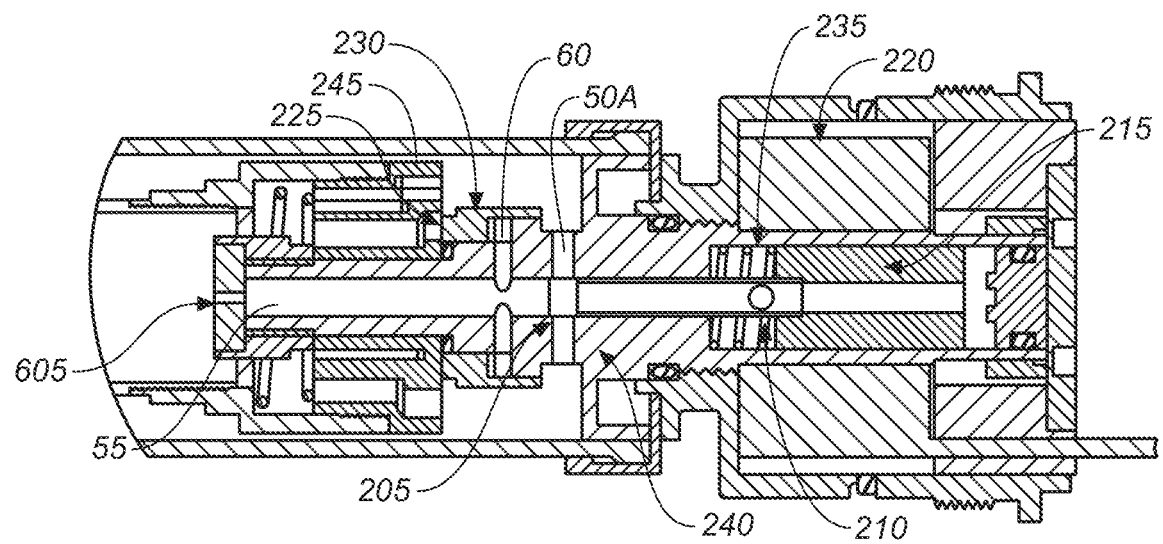
FIG. 6 and FIG. 7 each depicts a cross-sectional side elevation view of the valve assembly of detail 2 of the shock absorber of FIG. 1B, in accordance with an embodiment.
Figure 7:
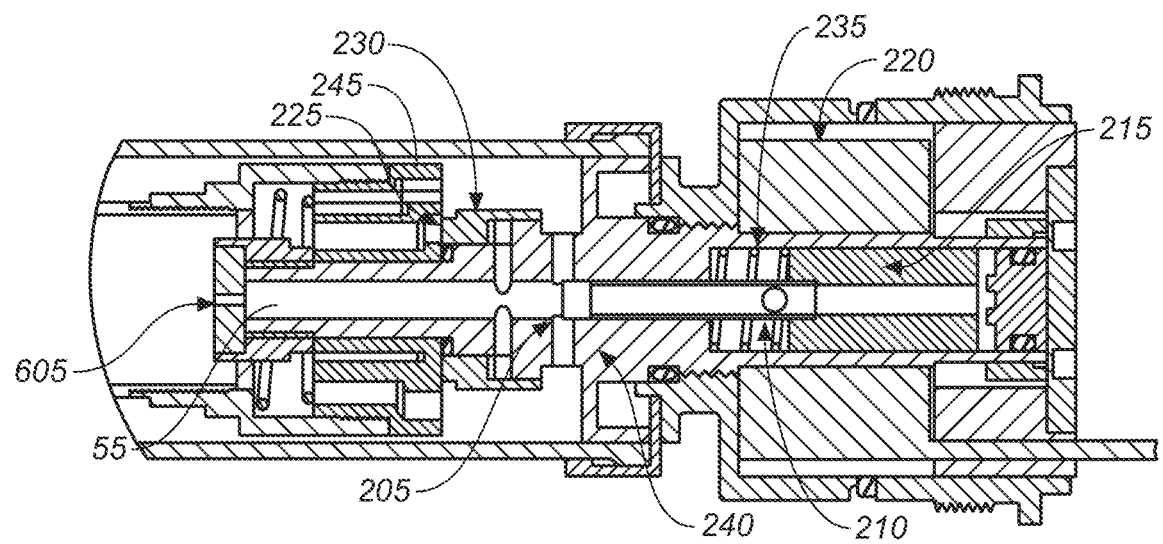

FIG. 6 and FIG. 7 depict a cross-sectional side elevation view of the valve assembly of detail 2 of the shock absorber of FIG. 1B, in accordance with an embodiment. FIG. 6 and FIG. 7 show an embodiment including a flow control orifice 605 for limiting flow through into the bleed passage 55 during compression. In limiting fluid flow, the flow control orifice 605 (by creating a pressure drop) places an upper limit on the amount of pressure in the annulus 60, and hence the amount of "boost" or closure force that the valve body 230 can exert on the valve shims 230. FIG. 6 shows the metering edge 205 of the pilot spool 210 obstructing ports 50A. FIG. 7 shows the metering edge 205 of the pilot spool 210 partially obstructing ports 50A.

Figure 8A:
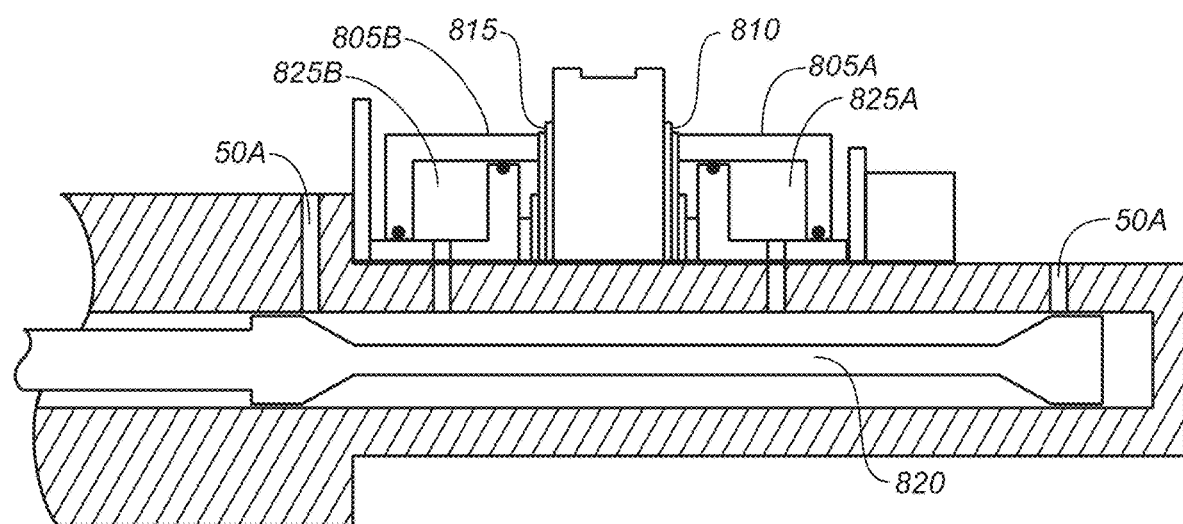
FIG. 8A and FIG. 8B depict a cross-sectional side elevation view of a shock absorber, in accordance with an embodiment.
Figure 8B:
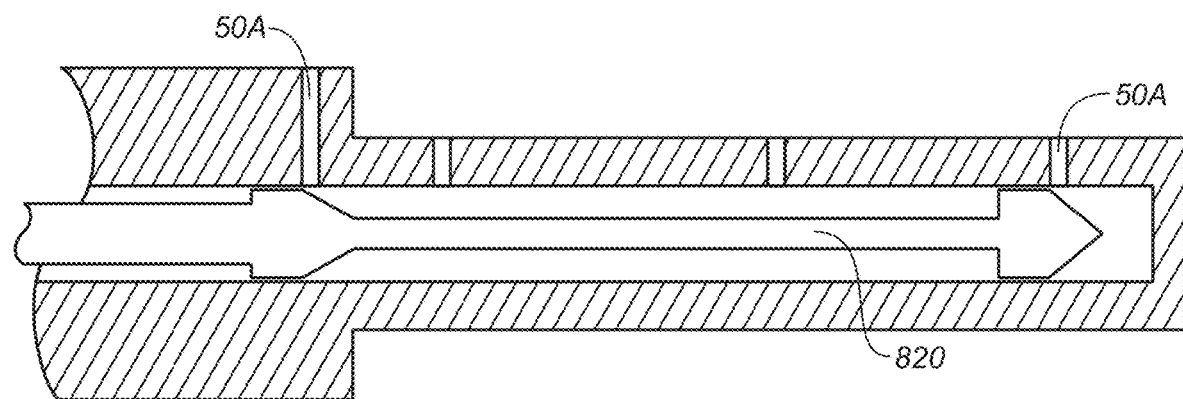

FIG. 8A and FIG. 8B depict a cross-sectional side elevation view of a shock absorber, in accordance with an embodiment. More particularly, FIG. 8A shows an embodiment having a separate valve body 805A and 805B corresponding to each of a rebound shim set 810 and a compression shim set 815, respectively, where a pilot spool 820 (performing, in one embodiment, similarly to the pilot spool 210 of FIGS. 1-7 described herein) alternatingly opens one area (e.g., 825A [similar to function to annulus 60]) while closing the other area (e.g., 825B [similar in function to annulus 60]). Of note, FIG. 8A shows a "hard/soft configuration". For example, during compression, the area 825A and area 825B experience obstruction by a portion of the pilot spool 820, thereby creating a soft compression. During the rebound, the area 825A and area 825B are open to fluid flow, thereby creating a firm rebound. Thus, there would be a high amount of pressure experienced during rebound. However, for compression, the pressure is low, but there is no bleed. FIG. 8B shows a "hard/hard configuration" (a firm compression and a firm rebound), in accordance with an embodiment.

FIGS. 9-13 depicts a cross-sectional side elevation view of the base valve assembly of detail 2 of FIG. 1B, including a "latching solenoid", in accordance with an embodiment. Embodiments further provide, in brief and as will be described below, a low-power bi-state electronic damper. The low-power bi-state electronic damper uses a latching solenoid to open and close a pressure-balanced pilot spool. Given the latching configuration of the solenoid, power is required only to open or close but not to hold in it in either setting, in accordance with an embodiment. The result is low power consumption.

Additionally, a further embodiment provides an externally-adjustable means of tuning the open state of the damper. There is an adjuster that can be turned in or out to vary the effective orifice size of the pilot spool when in the open position. This will allow the rider to adjust the soft setting of the damper to his/hers preference.

Figure 9:
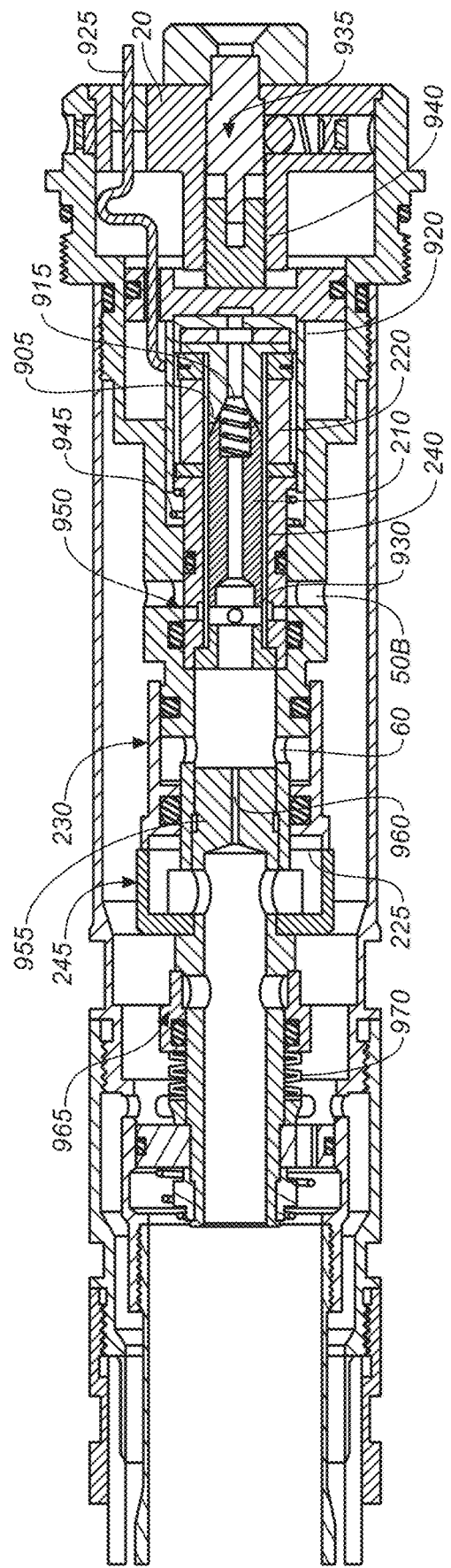
FIGS. 9-13 depict a cross-sectional side elevation view of the base valve assembly of detail 2 of FIG. 1B, including a "latching solenoid", in accordance with an embodiment.

With reference now to FIG. 9, the latching solenoid 905 primarily uses power to facilitate a change in position of the pilot spool 210 relative to the coil 220 but requires little or no power to maintain the pilot spool 210 in the desired position once that is achieved. In one embodiment, the latching solenoid assembly 905 (or latching spool valve assembly) includes: a pilot spool 210 which includes a magnetically active material; a spring 915 which is normally in compression and biases the pilot spool 210 toward a position obstructing ports 50A; a permanent magnet 920; and a coil 220 where power is supplied to the coil 220 by (in one embodiment) wires 925. The aforementioned components may be contained within a housing 240 or "cartridge" as shown.

The pilot spool valve assembly (including at least the pilot spool 210 and the metering edge 930 of the pilot spool 210) regulates damping fluid flow through a portion of the damper and adjusts the force applied to the valve shims 225 by the valve body 230 through ports 60. In one embodiment, the position of the spool valve assembly may be adjusted axially by means of the low speed adjuster 935. The low speed adjuster 935 (comprising multiple pieces), being for example, threaded at its lower end to the top cap 20 via the low speed adjuster threads 940, may be rotated to facilitate axial movement. In one embodiment, the low speed adjuster 935 includes a non-round shape (e.g., hexagonal) that facilitates the rotation with relative axial movement (see 1105 of FIG. 11).

With reference now to FIGS. 9-13, when the lower portion of the low speed adjuster 935 moves downward axially, the cartridge of the pilot spool 210 is correspondingly moved and thereby further compresses the spring 915. As the cartridge is moved downward, the low speed adjuster metering edge 950 is moved into further obstruction of ports 50B, thereby restricting flow of damping fluid through the damper from an interior of the pilot spool valve assembly to an exterior of the damping assembly (note the open ports 50B shown in FIG. 12, in which the pilot spool valve 210 is shown in the open pilot position with the low speed adjuster 935 in the soft position).

Figure 13:
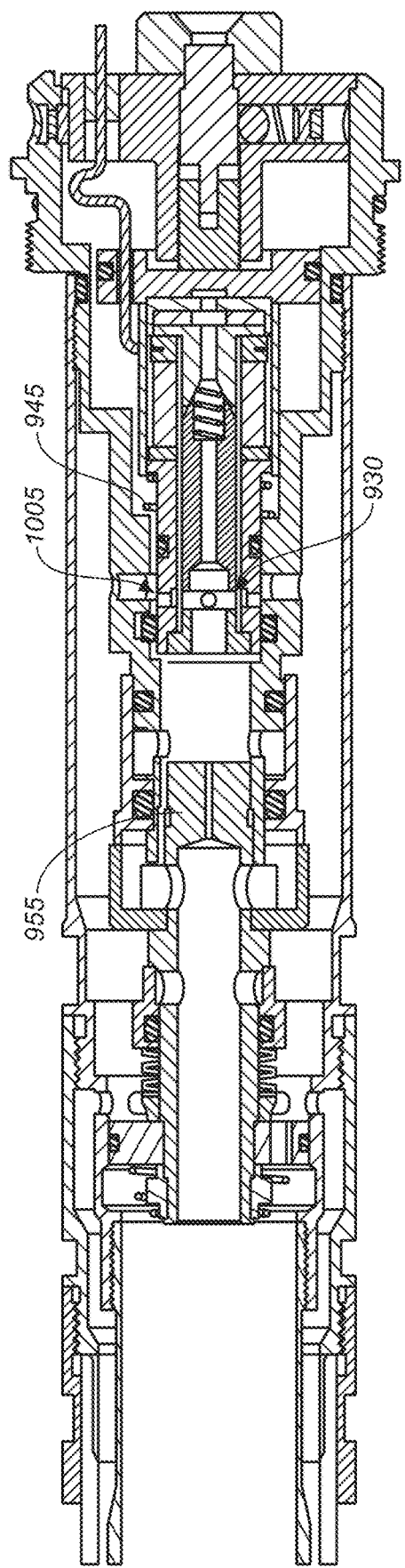

In one embodiment, the pilot spool 210 is biased by spring 915 toward a position wherein the metering edge 930 of the pilot spool 210 further obstructs ports 50A (see FIG. 13, wherein the pilot spool 210 is shown in the open pilot position with the low speed adjuster 935 in the middle position). A force opposing the bias of the spring 915 is exerted on the magnetic component of the pilot spool 210 by the permanent magnet 920. When the pilot spool 210 is in its uppermost (corresponding to open ports 50A) position, it is retained by the magnetic force between the permanent magnet 920 and the pilot spool valve 210 where that force is sufficient to overcome the bias of the spring 915 (thereby holding the spring 915 in a compressed state). As such, when the pilot spool valve 210 and ports 50A are in the open position (see FIG. 12), no power input is required to maintain that state.

In one embodiment, when it is desired to close or partially close ports 50A by means of the metering edge 930 of the pilot spool 210, a current is applied to the coil 220 via the wires 925. The current causes a magnetic flux around the coil 220, which acts on the magnetic component of the pilot spool 210 causing the pilot spool 210 to move axially within the cartridge. When the pilot spool 210 has moved a relatively small distance axially away from the permanent magnet 920, the spring 915 bias moves the pilot spool 210 toward closure of ports 50A with little or no additional power input to the coil 220.

Figure 10:
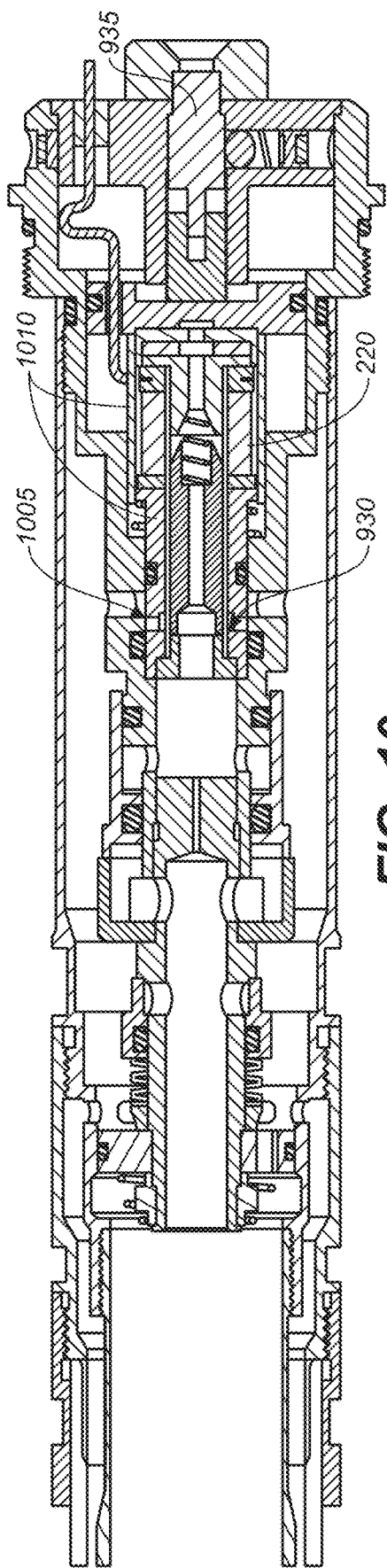
Figure 11:
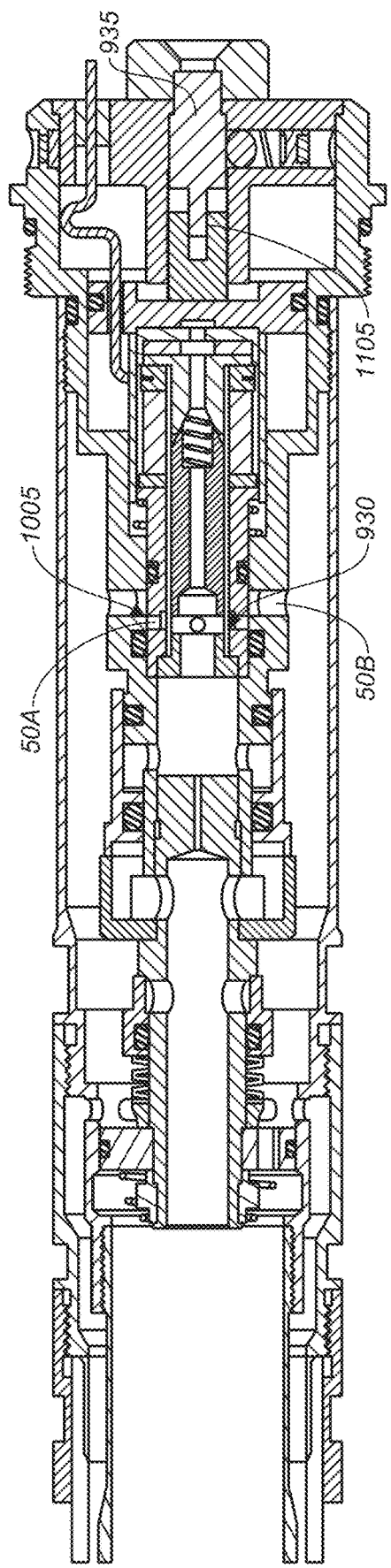
Figure 12:
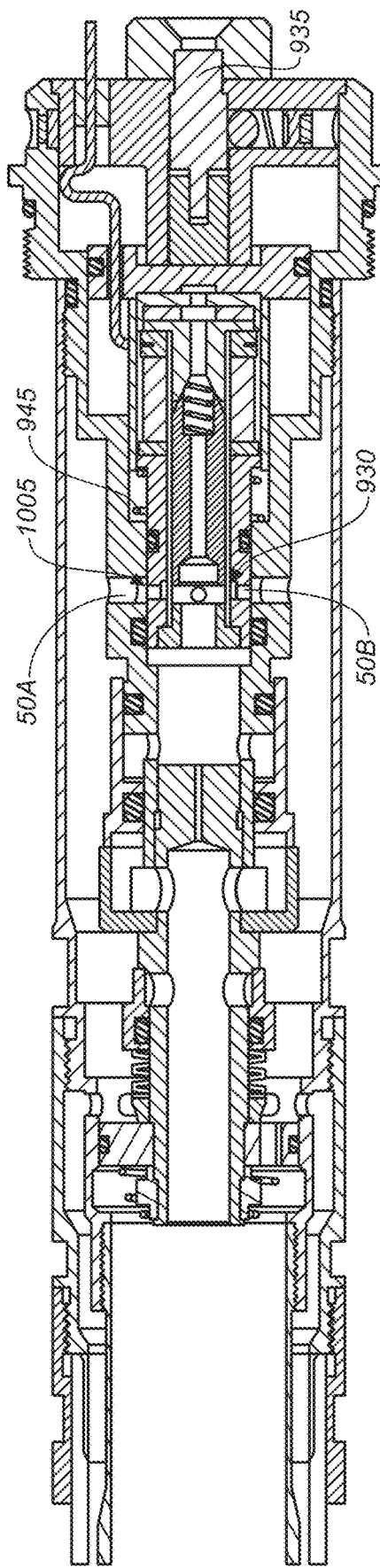

Of note, FIG. 10 shows the pilot spool 210 in the closed pilot position with the low speed adjuster 935 in the firm position. FIG. 11 shows the pilot spool 210 in the open pilot position with the low speed adjuster 935 in the firm position. FIG. 10 additionally shows the low speed adjuster metering edge 1005 and the spool valve assembly housing 1010, in accordance with an embodiment.

FIGS. 9-13 show an orifice block 955 having a tailored orifice 960 there through. The orifice 960 meters low speed damping fluid for low speed bump response of the suspension (when magnitude and rate is insufficient to open the shims). The size of the orifice 960 may be chosen to allow a desired amount or range of pressure to be applied to the valve body 230 through annulus 60 (ports). The use of the pilot spool 210 then further specifies that the pressure acts on the valve body 230 by modulating the flow restriction "downstream" (during a compression stroke of the suspension) of the orifice 960.

FIGS. 9-13 also show a pressure relief valve 965 or "blow off" valve, which is biased toward a closed position by Bellville spring(s) 970. The pressure relief valve 965 opens in response to an interior damper pressure above a predetermined threshold and thereby prevents damage to the damper and vehicle in the event of rapid pressure build up (usually associated with extreme suspension compression rate). The pressure relief valve 965 may have an adjustable threshold value (in one embodiment, by modification of the compression in the Bellville spring 970).

It should be noted that any of the features disclosed herein may be useful alone or in any suitable combination. While the foregoing is directed to embodiments of the present invention, other and further embodiments of the invention may be implemented without departing from the scope of the invention, and the scope thereof is determined by the claims that follow.

What is claimed is:

1. A vehicle suspension damper comprising:
   a primary valve;
   a pilot valve assembly, said pilot valve assembly comprising:
      an adjustable pilot spool configured for controlling a pressure inside said primary valve;
      a bleed passage; and
      a flow control orifice for limiting flow through into said bleed passage, said flow control orifice for limiting fluid flow through said bleed passage during compression of said vehicle suspension damper, said flow control orifice limiting a boost force exerted by said primary valve;
   an externally-adjustable adjuster, wherein said pilot valve assembly meters fluid to said primary valve, and movement of said externally-adjustable adjuster varies an effective orifice size of said adjustable pilot spool, said externally-adjustable adjuster disposed at a top cap of said vehicle suspension damper, and wherein said adjuster moves said primary valve in response to a current delivered from a power source;
   a set of shims coupled to said primary valve, wherein a position of said adjustable pilot spool corresponds to an increase of pressure inside said primary valve and an increase of said boost force on said set of shims by said primary valve;
   a damper cylinder;
   a base valve assembly;
   an elastic bladder;
   a first fluid flow path configured for providing a first fluid pathway for a movement of a first portion of said fluid through and between said damper cylinder, said base valve assembly, and said elastic bladder, wherein during at least one of a compression and a rebound of said vehicle suspension damper, said first portion of said fluid flows through said first fluid flow path, and during a damping of said compression and said rebound, said pilot valve assembly at least partially obstructs said first fluid flow path;
   a set of shims coupled to said base valve assembly, wherein a position of said pilot valve assembly corresponds to an increase of pressure inside said base valve assembly and an increase of an axial force on said set of shims by said base valve assembly.

2. The vehicle suspension damper of claim 1 further comprising:
   an armature coupled with said externally-adjustable adjuster and said pilot valve assembly.

3. The vehicle suspension damper of claim 1 further comprising:
   a coil, wherein said coil electromagnetically interacts with said armature in response to a current delivered from a power source, wherein when said armature moves, an adjustable pilot spool of said pilot valve assembly moves in corresponding axial positions relative to said coil.

4. The vehicle suspension damper of claim 3, wherein an amount of said current to be delivered by said power source is predetermined.

5. The vehicle suspension damper of claim 3, wherein said power source comprises:
   a solenoid.

6. The vehicle suspension damper of claim 1 further comprising:
   a latching solenoid coupled to said pilot valve assembly, said latching solenoid configured to adjust said pilot valve assembly.

7. The vehicle suspension damper of claim 6, wherein said latching solenoid assembly and a rotatable low speed adjuster can be turned in or out to vary an effective orifice size of said pilot spool when said pilot spool is in an open position.

8. The vehicle suspension damper of claim 1, further comprising:
   a rotatable low speed adjuster, wherein upon rotation of said low speed adjuster, an axial movement of said pilot valve assembly occurs, wherein upon said pilot spool being retained between a permanent magnet and said pilot valve assembly by a magnetic force, said magnetic force sufficient to overcome a spring biasing said pilot spool toward said position obstructing a set of ports.

9. The vehicle suspension damper of claim 8, further comprising:
an orifice block having a tailored orifice there through, said orifice configured for metering low speed damping fluid for low speed bump response of said vehicle suspension damper by allowing a predetermined amount of pressure to be applied to said valve body through said set of ports.

* * * * *